United States Patent
Mulkey

(10) Patent No.: US 11,593,899 B2
(45) Date of Patent: Feb. 28, 2023

(54) METHODS, SYSTEMS, APPARATUSES, AND DEVICES FOR FACILITATING STREAMLINING OF TRAVELING PROCESSES FOR TRAVELING

(71) Applicant: Frederick Dwayne Mulkey, Orlando, FL (US)

(72) Inventor: Frederick Dwayne Mulkey, Orlando, FL (US)

(*) Notice: Subject to any disclaimer, the term of this patent is extended or adjusted under 35 U.S.C. 154(b) by 0 days.

(21) Appl. No.: 17/882,349

(22) Filed: Aug. 5, 2022

(65) Prior Publication Data

US 2022/0375010 A1  Nov. 24, 2022

Related U.S. Application Data

(63) Continuation-in-part of application No. 17/560,098, filed on Dec. 22, 2021, now Pat. No. 11,443,105, which is a continuation-in-part of application No. PCT/US2021/045014, filed on Aug. 6, 2021.

(60) Provisional application No. 63/062,209, filed on Aug. 6, 2020.

(51) Int. Cl.
*G06Q 50/14* (2012.01)
*G06Q 10/02* (2012.01)

(52) U.S. Cl.
CPC .......... *G06Q 50/14* (2013.01); *G06Q 10/025* (2013.01)

(58) Field of Classification Search
CPC ............................. G06Q 50/14; G06Q 10/025
See application file for complete search history.

(56) References Cited

U.S. PATENT DOCUMENTS

| | | | |
|---|---|---|---|
| 9,185,840 B2 | 11/2015 | Crivello | |
| 9,412,140 B2 | 8/2016 | Molloy | |
| 10,540,729 B1 * | 1/2020 | Maeng | H04W 4/02 |
| 10,607,308 B2 * | 3/2020 | Burgess | H04W 12/08 |
| 2008/0243564 A1 | 10/2008 | Busch | |
| 2010/0153192 A1 * | 6/2010 | Hamilton, II | G06Q 10/08 705/13 |
| 2013/0268358 A1 | 10/2013 | Haas | |
| 2017/0129605 A1 | 5/2017 | Wu | |
| 2017/0337261 A1 | 11/2017 | Wang | |
| 2019/0090407 A1 | 3/2019 | Kime | |

(Continued)

FOREIGN PATENT DOCUMENTS

| CN | 107614121 B | 1/2018 |
|---|---|---|
| CN | 105447920 | 12/2018 |

(Continued)

*Primary Examiner* — Pinalben Patel

(57) ABSTRACT

Disclosed herein is a method for facilitating streamlining traveling processes for traveling, in accordance with some embodiments. Accordingly, the method comprises steps of receiving a travel itinerary information from a user device, receiving a location information of the user from the user device, analyzing the travel itinerary information and the location information using a machine learning model, retrieving a traveling requirement, transmitting a document requirement to the user device, receiving a user document from the user device, analyzing the user document, generating a travel application for procuring a travel document for the user, and transmitting the travel application to an agency device associated with an agency. Further, the at least one agency provides the travel document to the user for facilitating the traveling.

20 Claims, 33 Drawing Sheets

(56) References Cited

U.S. PATENT DOCUMENTS

2020/0211031 A1     7/2020  Patil
2020/0272948 A1*    8/2020  Meyer .................... G06Q 10/02
2021/0312552 A1*   10/2021  Simpson ............... H04W 4/029

FOREIGN PATENT DOCUMENTS

| CN | 110624717 | 12/2019 |
| EP | 3203424 A1 | 8/2017 |
| KR | 20090110660 A | 10/2009 |
| WO | WO2013163185 A1 | 10/2013 |
| WO | WO2016192024 A1 | 12/2016 |

\* cited by examiner

METHODS, SYSTEMS, APPARATUSES, AND DEVICES FOR FACILITATING STREAMLINING OF TRAVELING PROCESSES FOR TRAVELING

FIELD OF THE INVENTION

Generally, the present disclosure relates to the field of data processing. More specifically, the present disclosure relates to methods, systems, apparatuses, and devices for facilitating automating and streamlining of passport application processes for traveling.

BACKGROUND OF THE INVENTION

People often find themselves looking for ways to streamline the traveling process. Time is a precious resource therefore spending a plurality of hours standing in line at various offices trying to renew and obtain official travel documents can be a challenging and counterproductive task. Technology is continuously developing and it has become an integral part of human life. It brings innovation in a plurality of fields and in addition it also directly affects personal lifestyle. Most modern mobile phones have internet connectivity capabilities, the development of this feature allowed for a plurality of new opportunities and services. Software applications can provide a plurality of services, in a wide range of fields. A wide range of mobile apps are available and most major service based companies have apps and websites that are mobile compatible. Traveling can be a frustrating experience, especially the planning process. Traveling internationally for example requires planning in advance and a lot of steps to be completed beforehand such as getting the necessary travel documents, transportation, housing, etc. Regardless of the reason for traveling, either for business or for leisure purposes, the process can be a stressful experience. It is easy to omit a critical task before departure, and it is not uncommon to hear stories of people losing important travel documents such as passports or visas, right before departure time. Numerous mobile applications have been developed to apply novel technological development in a variety of fields, however, when due to the often complex bureaucratic process traveling in most cases is still done using traditional methods.

Therefore, there is a need for improved methods, systems, apparatuses, and devices for facilitating automating and streamlining of passport application processes for traveling that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating streamlining of traveling processes for traveling, in accordance with some embodiments. Accordingly, the method may include receiving, using a communication device, a travel itinerary information associated with a travel itinerary of a user from at least one user device associated with the user. Further, the travel itinerary information may include a traveling request and a traveling data. Further, the method may include receiving, using the communication device, a location information of the user from the at least one user device. Further, the at least one user device may include at least one location sensor. Further, the at least one location sensor may be configured for generating the location information of the user based on a location of the user. Further, the method may include analyzing, using a processing device, the travel itinerary information and the location information using a machine learning model. Further, the method may include retrieving, using a storage device, at least one traveling requirement associated with at least one travel document based on the analyzing of the travel itinerary information and the location information. Further, the at least one travel document may include at least one of a VISA and a passport. Further, the traveling requirement may include at least one document requirement associated with the at least one travel document. Further, the method may include transmitting, using the communication device, the at least one document requirement to the at least one user device. Further, the method may include receiving, using the communication device, at least one user document associated with the user corresponding to the at least one document requirement from the at least one user device. Further, the method may include analyzing, using the processing device, the at least one user document. Further, the method may include generating, using the processing device, a travel application for procuring the at least one travel document for the user using the at least one user document based on the analyzing of the at least one user document. Further, the method may include transmitting, using the communication device, the travel application to at least one agency device associated with the at least one agency. Further, the at least one agency provides the at least one travel document to the user for facilitating the traveling. Further, the at least one travel document may include at least one travel information associated with the at least one travel document.

Further disclosed herein is a system of facilitating streamlining of traveling processes for traveling, in accordance with some embodiments. Accordingly, the system may include a communication device configured for receiving a travel itinerary information associated with a travel itinerary of a user from at least one user device associated with the user. Further, the travel itinerary information may include a traveling request and a traveling data. Further, the communication device may be configured for receiving a location information of the user from the at least one user device. Further, the at least one user device may include at least one location sensor. Further, the at least one location sensor may be configured for generating the location information of the user based on a location of the user. Further, the communication device may be configured for transmitting at least one document requirement to the at least one user device. Further, the communication device may be configured for receiving at least one user document associated with the user corresponding to the at least one document requirement from the at least one user device. Further, the communication device may be configured for transmitting a travel application to at least one agency device associated with the at least one agency. Further, the at least one agency provides the at least one travel document to the user for facilitating the traveling. Further, the at least one travel document may include at least one travel information associated with the at least one travel document. Further, the system may include a processing device communicatively coupled with the communication device. Further, the processing device may be configured for analyzing the travel itinerary information and the location information using a machine learning model. Further, the processing device may be configured for analyzing the at least one user document. Further, the processing device may be configured for generating the travel application for procuring the at least one travel document for the user using the at least one user document based on the analyzing of the at least one user document. Further, the system may include a storage device communicatively coupled with the communication device. Further, the storage device may be configured for retrieving the at least one traveling requirement associated with at least one travel document based on the analyzing of the travel itinerary information and the location information. Further, the at least one travel document may include at least one of a VISA and a passport. Further, the traveling requirement may include at least one document requirement associated with the at least one travel document.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
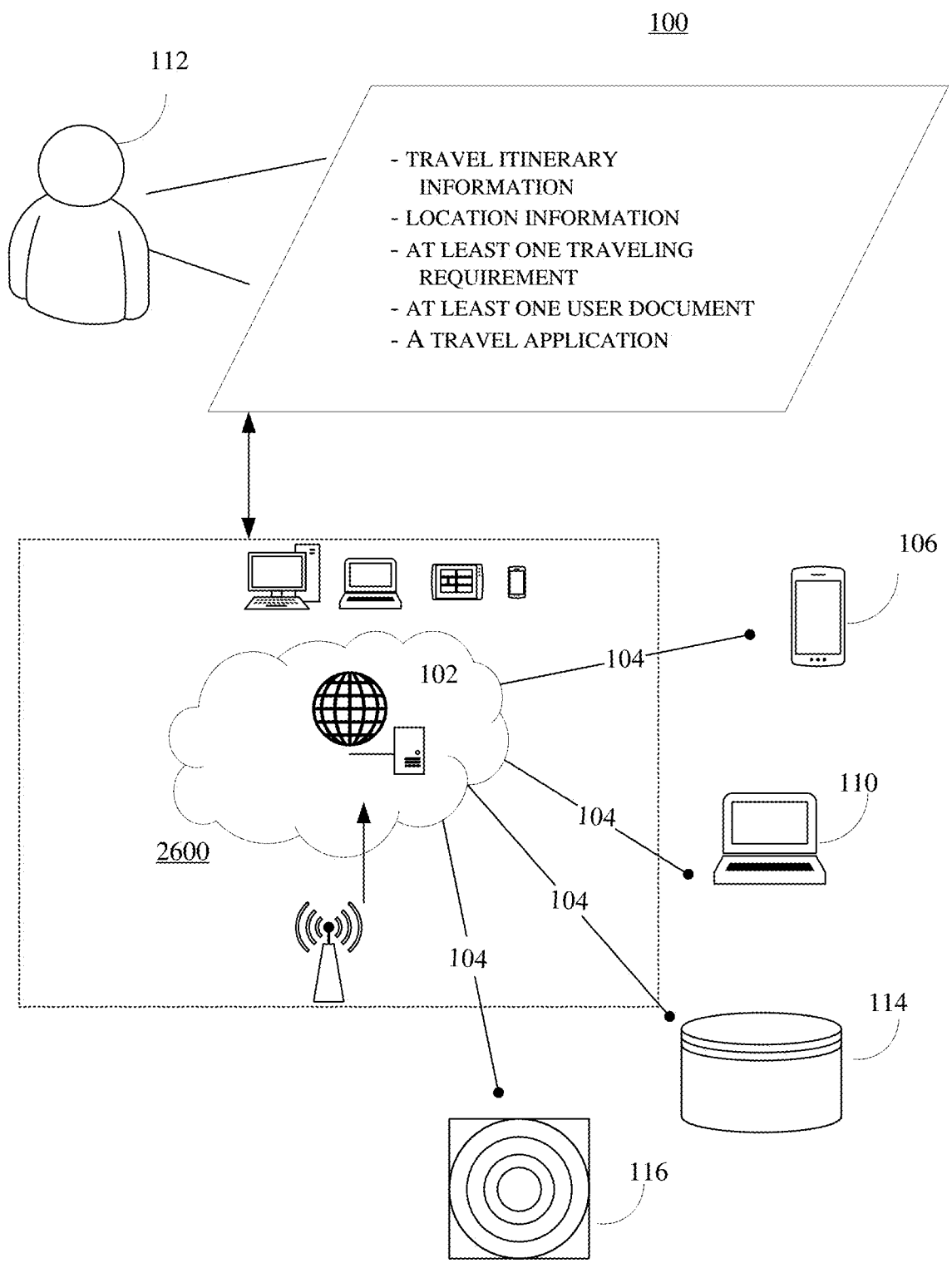
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating streamlining of traveling processes for traveling, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods, systems, apparatuses, and devices for facilitating streamlining of traveling processes for traveling. Further, the present disclosure describes automating and streamlining the passport application process by integrating the travel documents new applications, renewal, expedited services, and traveling arrangement features into a single mobile accessible platform. The present disclosure describes an ability to provide a plurality of services depending on the user's needs, from virtually anywhere they have internet connectivity. Furthermore, it would be especially helpful in a scenario where unexpected events occur such as the loss of important travel documents. A passport is required when traveling internationally. No matter how well planned an event is unforeseen actions such as stolen or lost belongings, can become a major inconvenience. The disclosed systems allow a user to obtain travel documents that can be accessed electronically. For example, e-Passports are becoming increasingly popular due to their convenience. As more countries adopt the technology electronic passports may gain in popularity. An e-passport includes a chip that holds the same information that is printed on the passport's pages, such as the name, date of birth, and other information. A user is able to scan the passport when entering their respective country and expedite the process required to pass through border patrols.

Further, the present disclosure describes a service based mobile application that allows users to complete their travel planning online. In addition, it offers a plurality of services such as applying and receiving an official document including expedited courier services if needed. Examples include passport, military I.D, and Driving License but are not limited to these options. Furthermore, the present disclosure describes incorporating booking and traveling arrangements and can integrate information from other planning platforms such as but not limited to Hotwire™, and Orbitz™. Users would be able to create an individual profile within the disclosed systems, with their personal information. Since photos are a requirement for identification purposes and most mobile devices currently have photo taking capabilities, the disclosed systems allow users to take the required photo and upload it to the disclosed systems where it would be formatted to the official governmental requirements. The Department of Homeland Security (DHS)/U. S. Department of State has specific requirements regarding when it comes to obtaining official travel documents, therefore the disclosed system is designed to work in accordance with the specific outlined rules.

Further, the disclosed methods, systems, apparatuses, and devices include a user interface, a communication module, an encryption module, RFID chip compatibility, and global positioning systems, but is not limited to these options. Since a plurality of mobile devices have fingerprint and/or face recognition technology, the disclosed systems further include fingerprint and/or face recognition capabilities. The user interface is the medium that facilitates the interaction between the user and the disclosed systems. It is important to highlight that simplicity of use is an important feature of the disclosed system. The user interface further comprises a language module that allows users to select between different languages. The communication module further comprises, a plurality of tools that allows the user to interact with official governmental institutions and a plurality of other traveling services such as hotels and rental car agencies.

Further, the present disclosure describes a process method between the user and the disclosed systems. Further, the process method may include a plurality of steps such as but not limited to downloading an application, creating a personal profile within the app, applying for an official document, receiving the official document either in physical or electronic format, obtaining an electronic passport QR code, and making travel arrangements.

Downloading the application is a straight forwards process, and it includes availability for a plurality of mobile platforms, such as but not limited to Apple iOS, Android, or Microsoft. In addition, the disclosed systems can be accessed via any computer that is connected to the internet.

Further, the disclosed methods, systems, apparatuses, and devices require a user to complete is to create a profile that includes their personal information. Communication between the user and government agencies or any other parties that interact with the disclosed systems can be achieved through the secured encryption channels. Communication may come in a variety of forms, such as but not limited to details to send physical mail, electronic mail, or direct phone calls. Users/applicants are able to submit and receive documents to governmental institutions/agencies using the disclosed systems, either by mail, online, or electronically, and receive a notification when the transfer of data was successful. Furthermore, the disclosed systems allow users to download and/or upload the required forms to obtain a certain document. The Department of Homeland Security (DHS)/U.S. Department of State requires citizens to include information such as full name, date of birth, gender, country of citizenship, and picture proof. Once this step is complete the user would be able to select the service they desire, such as but not limited to applying for a new document and/or renewing an existing one. The completion process is tailored specifically to the type of document the user requires, however the general steps remain largely the same. However, each application form is slightly different with different requirements and documents. For example, in the instance, the user applies to for a new passport application. First, the disclosed systems would direct them to apply for the required form DS-11, allowing the user to complete the form within the app and provide an electronic signature. The disclosed systems may use a system of formatting similar to the already accepted industry standard, such as but not limited to adobe acrobat software. Next, a proof of citizenship would be required such as a birth certificate, etc. to be verified using U.S government databases. The disclosed systems would allow a user to upload a birth certificate and recognize the defining watermark or seal to check for validity. After the document, has been complete the information can be checked for validity and accuracy. Furthermore, all the required application documents may be verified in person, directly over the computer, telephone via an app, teleconferencing call (i.e. zoom, facetime, etc.), and/or uploaded directly to a verification services such as checkpoint, net. Verify, and/or federal government agencies such as USCIS as well as vital statistics records, etc. Furthermore, a proof of identification would be required such as but not limited to a driver's license, a state issued identification, or an official governmental ID. For the photo requirement, the user would be able to take a photo using the camera of their mobile device or use a stored photo and adapt it to the correct format required by the Government. Additionally, the document pre-check review/final verification process can be completed directly over the computer, via the app, or in person. The application/document can be signed via wet signature and/or electronic/digital signature once instructed to do so by a certified passport acceptance agent/notary after initiating a video teleconferencing. In order to pay for the government fees the disclosed systems also include an electronic payment module. A plurality of payment methods can be included in the disclosed systems, such as but not limited to flexible payment plans, ACH, credit cards, and debit cards, etc. Further, in an instance of the passport renewal process, the user applies for a renewal passport application. Secondly, the disclosed systems may direct the user to apply for a required form DS-82. Qualified users/applicants would have to meet all eligibility requirements. Further, the users who are eligible may not have to submit the normally required supporting documentation since they currently have a passport and prior documentation can be verified by other systems. Further, the users/applicants who are not eligible may have to submit all the required documentation either through the disclosed system and/or by the traditional paper application process via mail. Once the user has completed all of the required steps they are able to complete the order securely via the encryption module. Due to the sensibility of the data which is required by the disclosed systems, all of the communication between the user, the disclosed systems, and any other parties would be completed through a complex encryption module which may include features such as but not limited to passwords with different characters, and pin numbers. The disclosed systems allow the user to apply electronically/digitally to government agencies such as passport agencies, etc and track status of application and/or receive a copy of their passport physically via courier services/mail and/or electronically, once all of the information has been processed and verified electronically and/or manually. These features would automate and streamline the process and allow a citizen to obtain an official document faster.

Further, the disclosed methods, systems, apparatuses, and devices allow the user to make travel arrangements if they desire to do so. By incorporating GPS capabilities, the user would be able to make arrangements using their position from the local area, or in accordance with their travel itinerary. The disclosed systems are able to compile information such as hotel and rental car availability, as well as pricing quotes for these services.

Further, the disclosed methods, systems, apparatuses, and devices facilitate entering the country after the trip is completed. Further, the disclosed systems and methods are able to guide a user through the border patrol process. The disclosed systems would be able to scan a physical copy of the passport with NFC and/or by utilizing a phone camera in the app. Any document that is scanned into the disclosed systems, can be auto-populated with the user's saved information. In addition, the disclosed systems allow the user to customize and adapt any information depending on user preference. In an auto-complete feature, the disclosed systems are able to complete certain fields such as but not limited to passport number, Issue and Expiration date, full name, DOB, country of citizenship, etc. Depending on the option the user chooses, either a physical passport or an e-passport, and the disclosed systems are able to adapt the autofill feature. When an e-passport is requested the user can skip the scanning process and go directly to filling out the required forms. The disclosed systems are able to support a plurality of formats for opening forms, such as but not limited to Portable Document Format (PDF). The disclosed systems are able to both upload and download forms. The next step would be to specify the method of entering the country, such as but not limited to a boat, and a plane. The user would be able to fill out the basic information required by the government (U.S Customs and Border Protection) using the disclosed systems and any other forms (CBP Declaration Form 6059B). After the information, has been uploaded the user will receive a QR code from the U.S Customs and Border Protection valid only for a limited amount of time. To ensure that the information is always secured the encryption module also includes a pin number in case the device from which the application is accessed is lost or stolen.

Further, the disclosed methods, systems, apparatuses, and devices comprise a plurality of modules that facilitate the functionality of the system. To ensure that all the data and, the communication conducted using the disclosed systems is thoroughly secured, the application includes an encryption module. The encryption may include a plurality of methods such as but not limited to, long passwords, security key generation, and individualized pin codes for each user.

Further, the present disclosure relates to a mobile travel document application. More specifically, the present disclosure describes allowing a user to apply for, and use an electronic travel document that would help simplify the traveling process.

Further, the present disclosure describes a mobile passport application.

FIG. 1 is an illustration of an online platform 100 consistent with various embodiments of the present disclosure. By way of non-limiting example, the online platform 100 to facilitate streamlining of traveling processes for traveling may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, the databases 114 may be associated with government agencies. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 2600.

Figure 2:
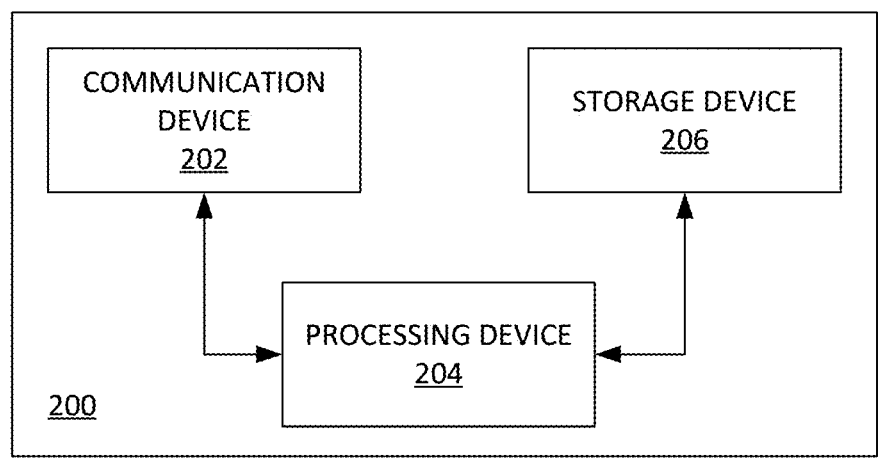
FIG. 2 is a block diagram of a system for facilitating streamlining of traveling processes for traveling, in accordance with some embodiments.

FIG. 2 is a block diagram of a system 200 for facilitating streamlining of traveling processes for traveling, in accordance with some embodiments. Accordingly, the system 200 may include a communication device 202, a processing device 204, and a storage device 206.

Further, the communication device 202 may be configured for receiving travel itinerary information associated with a travel itinerary of a user from at least one user device. Further, the at least one user device may include a smartphone, a tablet, a desktop, a laptop, a smartwatch, etc. Further, the communication device 202 may be configured for receiving location information of the user from the at least one user device. Further, the at least one user device may include at least one location sensor. Further, the at least one location sensor may be configured for generating the location information of the user based on a location of the user. Further, the communication device 202 may be configured for transmitting at least one traveling requirement to the at least one user device. Further, the communication device 202 may be configured for receiving at least one user document associated with the user corresponding to the at least one traveling requirement from the at least one user device. Further, the at least one user document may include a proof of identification, a proof of citizenship, a birth certificate, a photo identification, a physical passport, user information, a user picture, an e-signature, etc. Further, the communication device 202 may be configured for transmitting a travel application to at least one agency device associated with at least one agency. Further, the at least one agency may include a government agency, an accommodation agency, a car rental agency, etc. Further, the at least one user document may be verified electronically by the government agency. Further, the travel application may be sent electronically to the at least one agency device associated with the government agency. Further, the at least one agency provides the at least one travel document to the user for facilitating the traveling. Further, the at least one travel document may include an electronic passport, a physical passport, a voucher, a coupon, a QR code, etc.

Further, the processing device 204 may be communicatively coupled with the communication device 202. Further, the processing device 204 may be configured for analyzing the travel itinerary information and the location information. Further, the processing device 204 may be configured for determining at least one traveling need of the user for the traveling based on the analyzing of the travel itinerary information and the location information. Further, the processing device 204 may be configured for identifying at least one traveling service for the at least one traveling need and the at least one agency providing the at least one traveling service based on the determining of the at least one traveling need. Further, the at least one traveling service may include a passport procuring service, a passport renewal service, a transportation service, an accommodation service, an immigration service, an emigration service, a visa procuring service, a visa renewal service, etc. Further, the processing device 204 may be configured for analyzing the at least one user document. Further, the processing device 204 may be configured for generating the travel application for procuring the at least one travel document for the user using the at least one user document based on the analyzing of the at least one user document.

Further, the storage device 206 may be communicatively coupled with the processing device 204. Further, the storage device 206 may be configured for retrieving the at least one traveling requirement required by the at least one agency for providing the at least one traveling service based on the identifying.

Further, in some embodiments, the analyzing of the travel itinerary information and the location information may include analyzing the travel itinerary information and the location information using at least one first machine learning model. Further, the determining of the at least one traveling need may be based on the analyzing of the travel itinerary information and the location information using the at least one first machine learning model.

Further, in some embodiments, the analyzing of the at least one user document may include analyzing the at least one user document using at least one second machine learning model. Further, the at least one second machine learning model may be trained for recognizing a marker indicative of at least one of a accurateness and a validity of the at least one user document. Further, the marker may include a watermark, a hologram, a seal, etc. Further, the generating of the travel application may be based on the recognizing of the marker.

Further, in some embodiments, the analyzing of the at least one user document may include analyzing the at least one user document using at least one third machine learning model. Further, the at least one third machine learning model may be trained for extracting at least one user information present in the at least one user document. Further, the at least one user information may include a name, an address, a nationality, a date of birth, a photograph, etc. Further, the generating of the travel application may be based on the extracting.

Further, in some embodiments, the analyzing of the at least one user document may include formatting the at least one user document based on at least one document format requirement associated with the at least one agency. Further, the generating of the travel application may be based on the formatting. Further, the formatting may include cropping, sizing, resolution adjusting, etc. Further, the at least one document format requirement may include a size, a shape, a resolution, etc.

Further, in some embodiments, the at least one user device may include at least one capturing device. Further, the at least one capturing device may be configured for generating the at least one user document based on capturing at least one biometric of the user. Further, the at least one capturing device may include a camera, a microphone, etc. Further, the at least one biometric may include a fingerprint, a face, an iris, a retina, a voice, etc.

Further, in some embodiments, the at least one user device may include at least one scanning device. Further, the at least one scanning device may be configured for generating the at least one user document based on scanning at least one physical user document of the user. Further, the at least one physical user document may include a physical identification card, a physical passport, a physical visa, etc.

Further, in some embodiments, the at least one user device may include at least one input device. Further, the at least one input device may be configured for generating the at least one user document based on at least one action performed by the user using the at least one input device.

Further, in some embodiments, the communication device 202 may be configured for receiving at least one user identifier of the user from the at least one user device. Further, the at least one user identifier may include a name, a photograph, etc. Further, the processing device 204 may be configured for identifying at least one user travel document owned by the user based on the at least one user identifier. Further, the processing device 204 may be configured for analyzing the at least one user travel document and the travel itinerary information. Further, the determining of the at least one traveling need of the user may be based on the analyzing of the at least one user travel document.

Further, in some embodiments, the storage device 206 may be configured for retrieving traveling service data associated with the at least one traveling service based on the identifying of the at least one traveling service. Further, the processing device 204 may be configured for analyzing the traveling service data. Further, the processing device 204 may be configured for determining at least one of an availability and a price of the at least one traveling service provided by the at least one agency based on the analyzing of the traveling service data. Further, the processing device 204 may be configured for generating a notification based on the determining of at least one of the availability and the price. Further, the notification may include at least one of the availability and the price. Further, the communication device 202 may be configured for transmitting the notification to the at least one user device.

Figure 3:
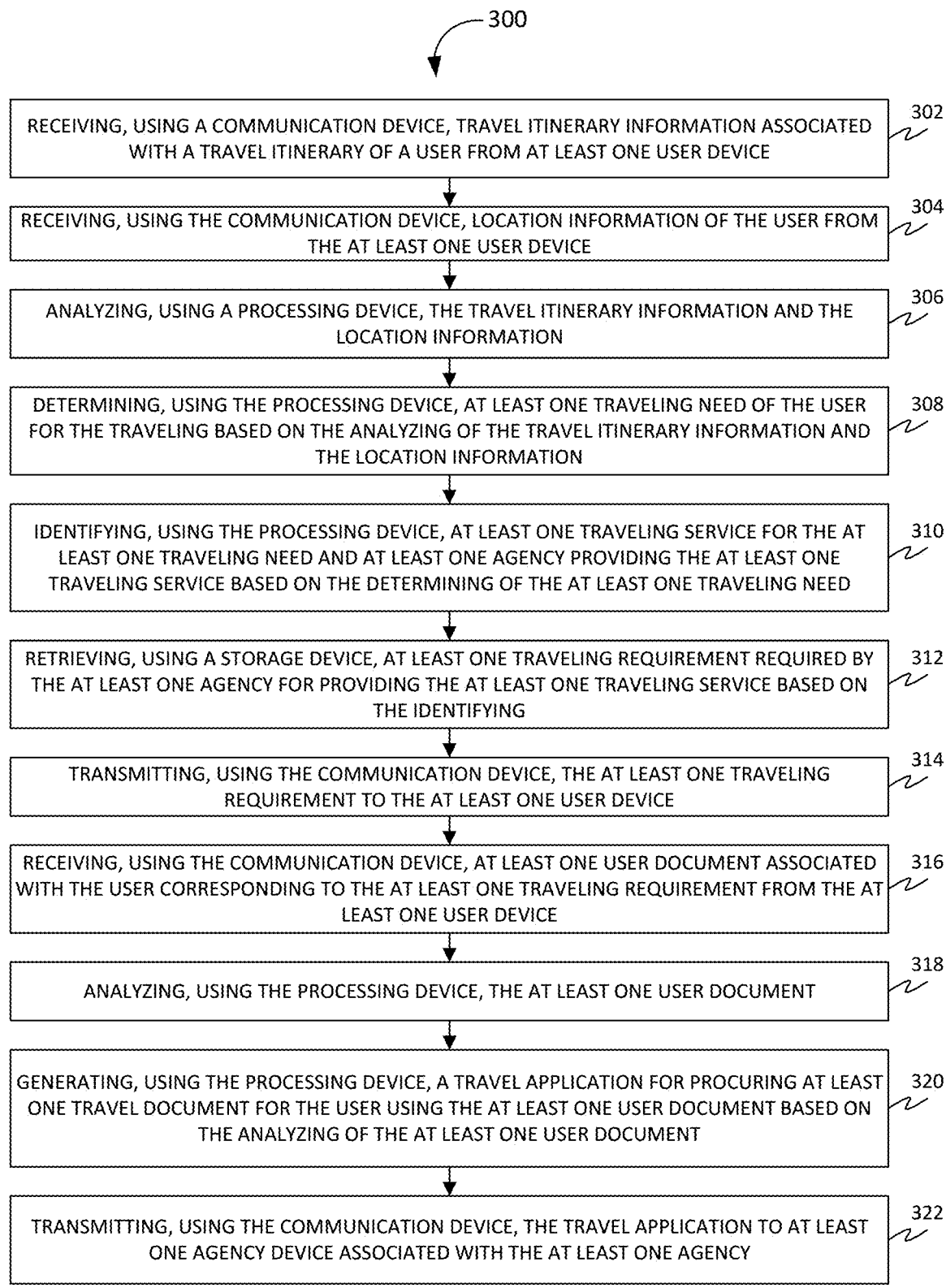
FIG. 3 is a flowchart of a method for facilitating streamlining of traveling processes for traveling, in accordance with some embodiments.

FIG. 3 is a flowchart of a method 300 for facilitating streamlining of traveling processes for traveling, in accordance with some embodiments. Accordingly, at 302, the method 300 may include a step of receiving, using a communication device, travel itinerary information associated with a travel itinerary of a user from at least one user device.

Further, at 304, the method 300 may include a step of receiving, using the communication device, location information of the user from the at least one user device. Further, the at least one user device may include at least one location sensor. Further, the at least one location sensor may be configured for generating the location information of the user based on a location of the user.

Further, at 306, the method 300 may include a step of analyzing, using a processing device, the travel itinerary information and the location information.

Further, at 308, the method 300 may include a step of determining, using the processing device, at least one traveling need of the user for the traveling based on the analyzing of the travel itinerary information and the location information.

Further, at 310, the method 300 may include a step of identifying, using the processing device, at least one traveling service for the at least one traveling need and at least one agency providing the at least one traveling service based on the determining of the at least one traveling need.

Further, at 312, the method 300 may include a step of retrieving, using a storage device, at least one traveling requirement required by the at least one agency for providing the at least one traveling service based on the identifying.

Further, at 314, the method 300 may include a step of transmitting, using the communication device, the at least one traveling requirement to the at least one user device.

Further, at 316, the method 300 may include a step of receiving, using the communication device, at least one user document associated with the user corresponding to the at least one traveling requirement from the at least one user device.

Further, at 318, the method 300 may include a step of analyzing, using the processing device, the at least one user document.

Further, at 320, the method 300 may include a step of generating, using the processing device, a travel application for procuring at least one travel document for the user using the at least one user document based on the analyzing of the at least one user document.

Further, at 322, the method 300 may include a step of transmitting, using the communication device, the travel application to at least one agency device associated with the at least one agency. Further, the at least one agency provides the at least one travel document to the user for facilitating the traveling.

Further, in some embodiments, the analyzing of the travel itinerary information and the location information may include analyzing the travel itinerary information and the location information using at least one first machine learning model. Further, the determining of the at least one traveling need may be based on the analyzing of the travel itinerary information and the location information using the at least one first machine learning model.

Further, in some embodiments, the analyzing of the at least one user document may include analyzing the at least one user document using at least one second machine learning model. Further, the at least one second machine learning model may be trained for recognizing a marker indicative of at least one of a accurateness and a validity of the at least one user document. Further, the generating of the travel application may be based on the recognizing of the marker.

Further, in some embodiments, the analyzing of the at least one user document may include analyzing the at least one user document using at least one third machine learning model. Further, the at least one third machine learning model may be trained for extracting at least one user information present in the at least one user document. Further, the generating of the travel application may be based on the extracting.

Further, in some embodiments, the analyzing of the at least one user document may include formatting the at least one user document based on at least one document format requirement associated with the at least one agency. Further, the generating of the travel application may be based on the formatting.

Further, in some embodiments, the at least one user device may include at least one capturing device. Further, the at least one capturing device may be configured for generating the at least one user document based on capturing at least one biometric of the user.

Further, in some embodiments, the at least one user device may include at least one scanning device. Further, the at least one scanning device may be configured for generating the at least one user document based on scanning at least one physical user document of the user.

Further, in some embodiments, the at least one user device may include at least one input device. Further, the at least one input device may be configured for generating the at least one user document based on at least one action performed by the user using the at least one input device.

Figure 4:
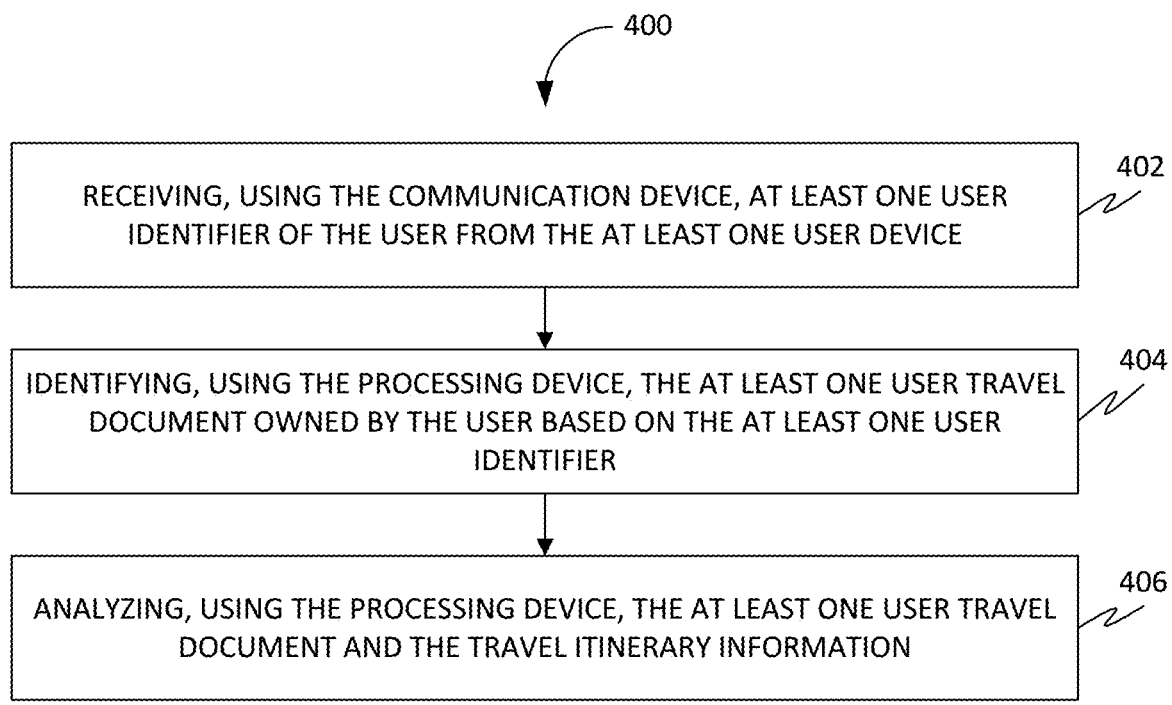
FIG. 4 is a flowchart of a method for determining the at least one traveling need based on at least one user travel document of the user for facilitating the streamlining of the traveling processes, in accordance with some embodiments.

FIG. 4 is a flowchart of a method 400 for determining the at least one traveling need based on at least one user travel document of the user for facilitating the streamlining of the traveling processes, in accordance with some embodiments.

Accordingly, at 402, the method 400 may include a step of receiving, using the communication device, at least one user identifier of the user from the at least one user device.

Further, at 404, the method 400 may include a step of identifying, using the processing device, the at least one user travel document owned by the user based on the at least one user identifier.

Further, at 406, the method 400 may include a step of analyzing, using the processing device, the at least one user travel document and the travel itinerary information. Further, the determining of the at least one traveling need of the user may be based on the analyzing of the at least one user travel document.

Figure 5:
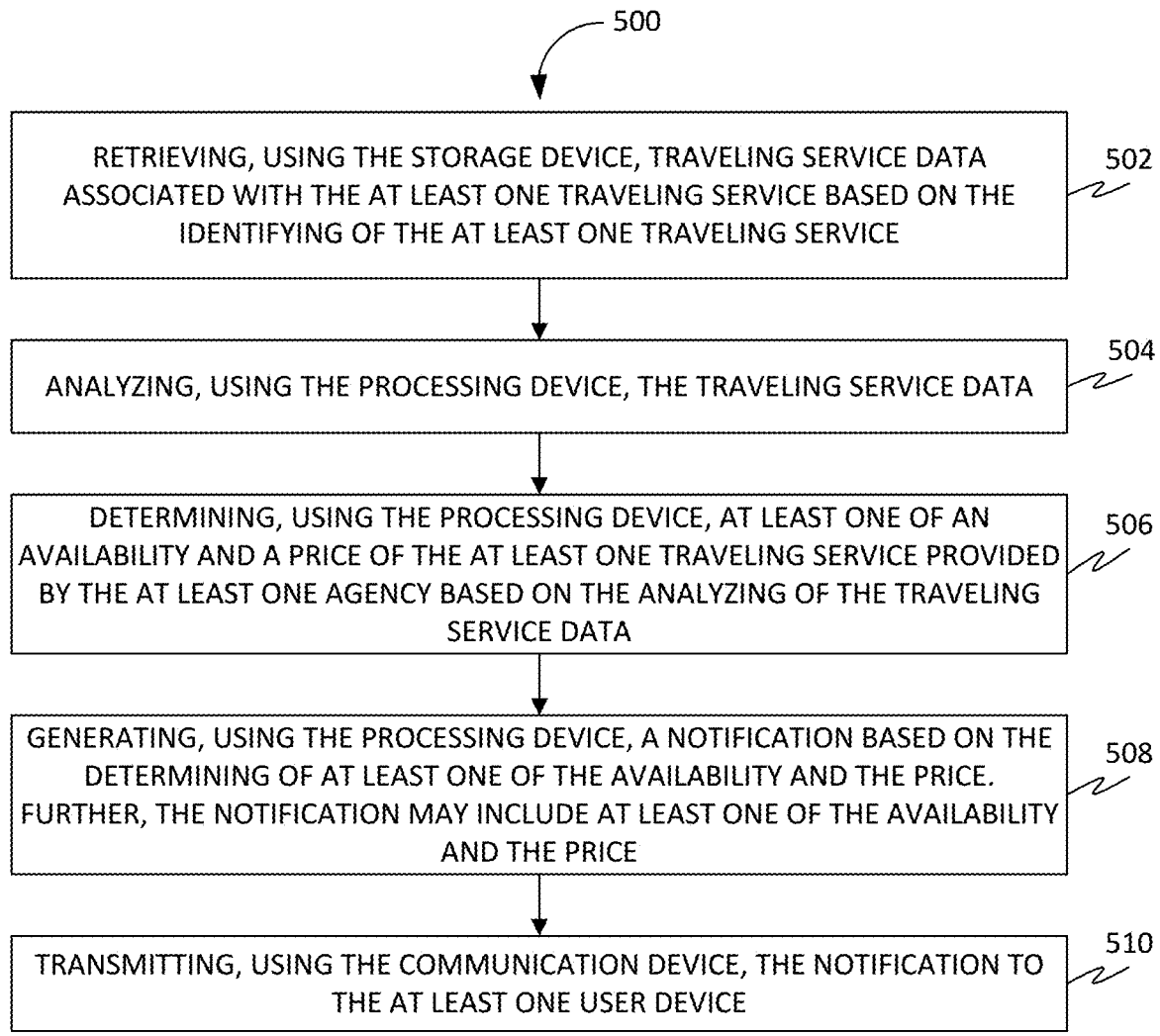
FIG. 5 is a flowchart of a method for determining an availability and a price of the at least one traveling service for facilitating the streamlining of the traveling processes, in accordance with some embodiments.

FIG. 5 is a flowchart of a method 500 for determining an availability and a price of the at least one traveling service for facilitating the streamlining of the traveling processes, in accordance with some embodiments. Accordingly, at 502, the method 500 may include a step of retrieving, using the storage device, traveling service data associated with the at least one traveling service based on the identifying of the at least one traveling service.

Further, at 504, the method 500 may include a step of analyzing, using the processing device, the traveling service data.

Further, at 506, the method 500 may include a step of determining, using the processing device, at least one of an availability and a price of the at least one traveling service provided by the at least one agency based on the analyzing of the traveling service data.

Further, at 508, the method 500 may include a step of generating, using the processing device, a notification based on the determining of at least one of the availability and the price. Further, the notification may include at least one of the availability and the price.

Further, at 510, the method 500 may include a step of transmitting, using the communication device, the notification to the at least one user device.

Figure 6:
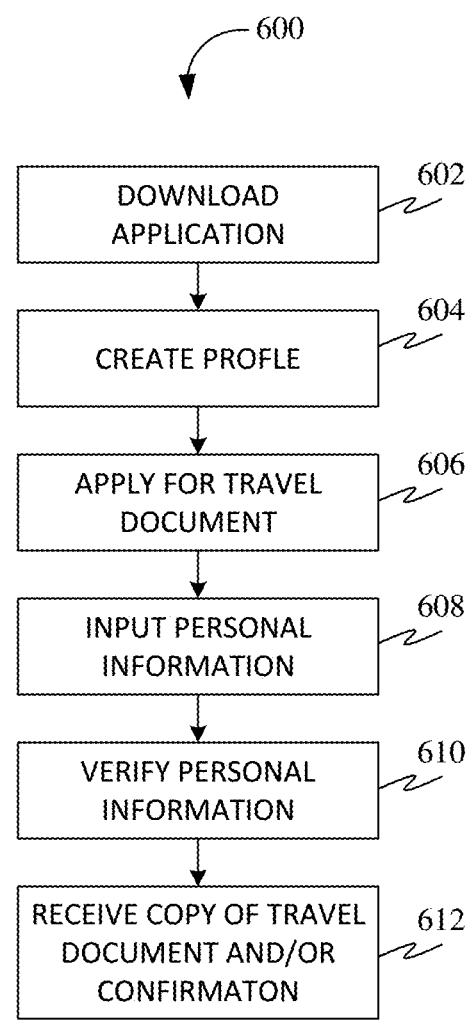
FIG. 6 is a flowchart of a method for facilitating streamlining of traveling processes for traveling, in accordance with some embodiments.

FIG. 6 is a flowchart of a method 600 for facilitating streamlining of traveling processes for traveling, in accordance with some embodiments. Accordingly, at 602, the method 600 may include downloading an application. Further, at 604, the method 600 may include creating a profile. Further, at 606, the method 600 may include applying for a travel document. Further, at 608, the method 600 may include inputting personal information. Further, at 610, the method 600 may include verifying the personal information. Further, at 612, the method 600 may include receiving a copy of a travel document and/or a confirmation.

Figure 7:
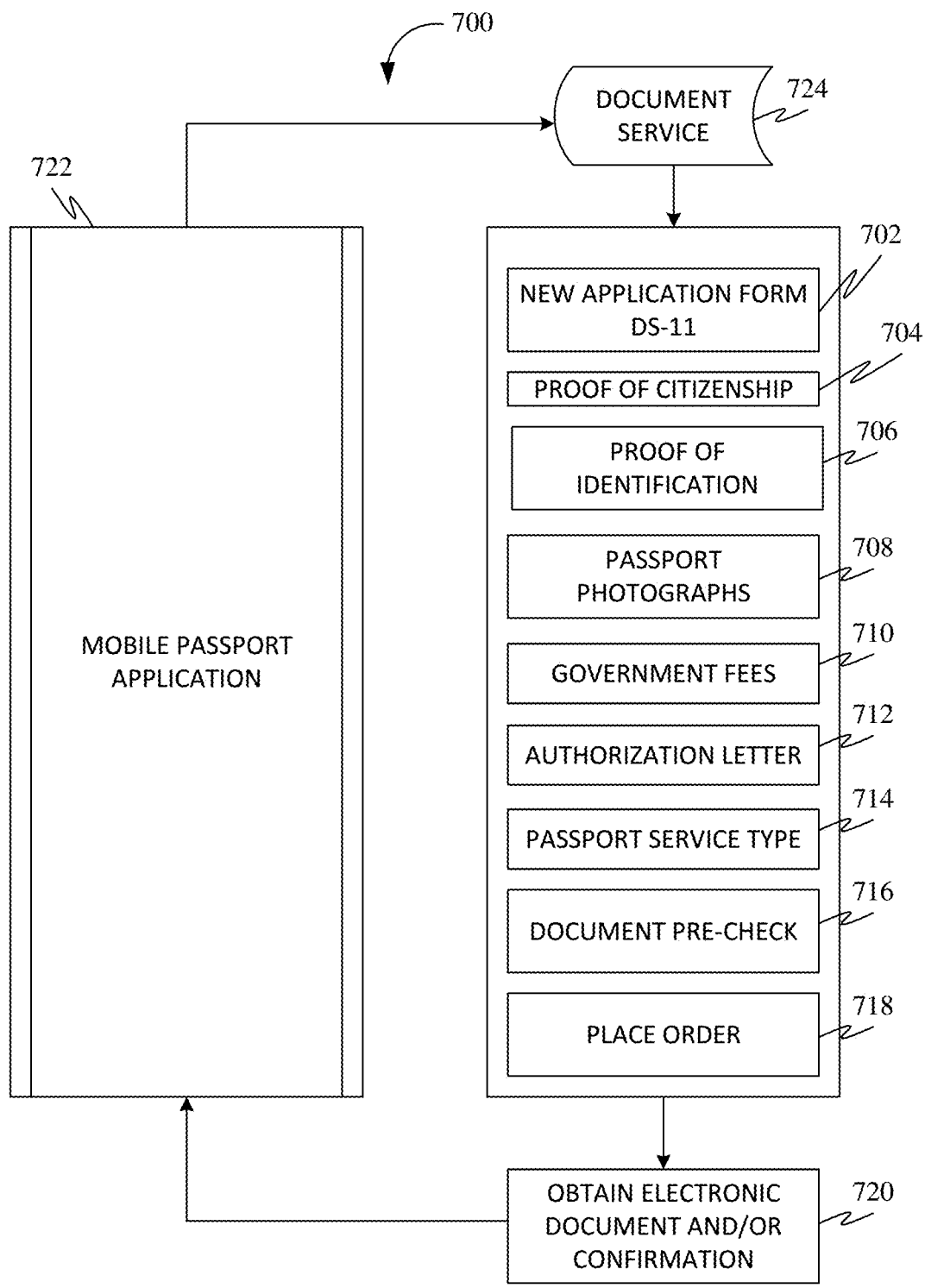
FIG. 7 is a flowchart of a method for obtaining documents for facilitating the streamlining of the traveling processes, in accordance with some embodiments.

FIG. 7 is a flowchart of a method 700 for obtaining documents for facilitating the streamlining of the traveling processes, in accordance with some embodiments. Accordingly, at 702, the method 700 may include receiving a new application form DS-11. Further, at 704, the method 700 may include receiving a proof of citizenship. Further, at 706, the method 700 may include receiving a proof of identification. Further, at 708, the method 700 may include receiving passport photographs. Further, at 710, the method 700 may include receiving government fees. Further, at 712, the method 700 may include receiving an authorization letter. Further, at 714, the method 700 may include receiving a passport service type. Further, at 716, the method 700 may include performing a document pre-check. Further, at 718, the method 700 may include placing an order. Further, at 720, the method 700 may include obtaining an electronic document and/or a confirmation. Further, the electronic document and/or the confirmation may be transferred to a mobile passport application 722. Further, the method 700 provides a document service 724 for the obtaining of the documents. Further, the mobile passport application 722 may be associated with the document service 724.

Figure 8:
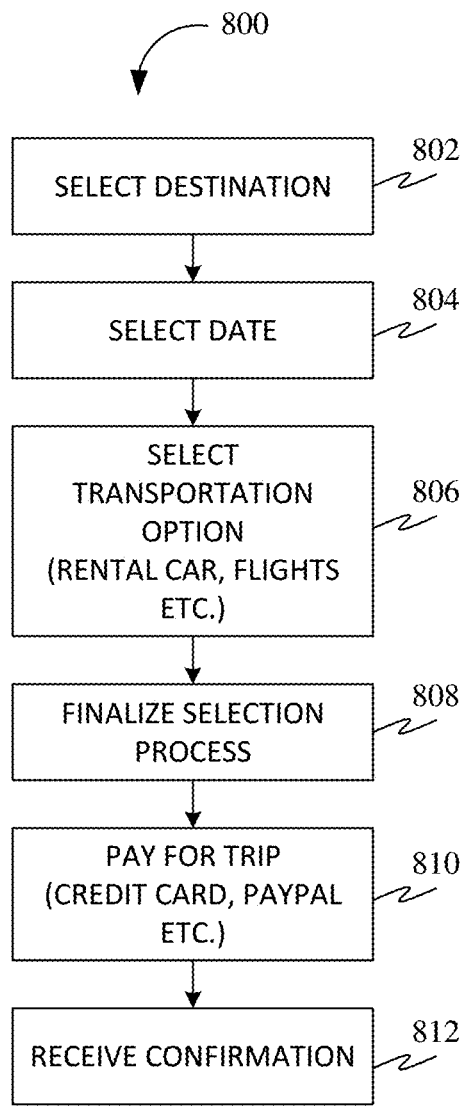
FIG. 8 is a flowchart of a method for conducting travel arrangements for facilitating the streamlining of the traveling processes, in accordance with some embodiments.

FIG. 8 is a flowchart of a method 800 for conducting travel arrangements for facilitating the streamlining of the traveling processes, in accordance with some embodiments. Accordingly, at 802, the method 800 may include selecting a destination. Further, at 804, the method 800 may include selecting a date. Further, at 806, the method 800 may include selecting a transportation option (rental cars, flights, etc.). Further, at 808, the method 800 may include finalizing a selection process. Further, at 810, the method 800 may include paying for a trip (credit card, PayPal, etc.). Further, at 812, the method 800 may include receiving a confirmation.

Figure 9:
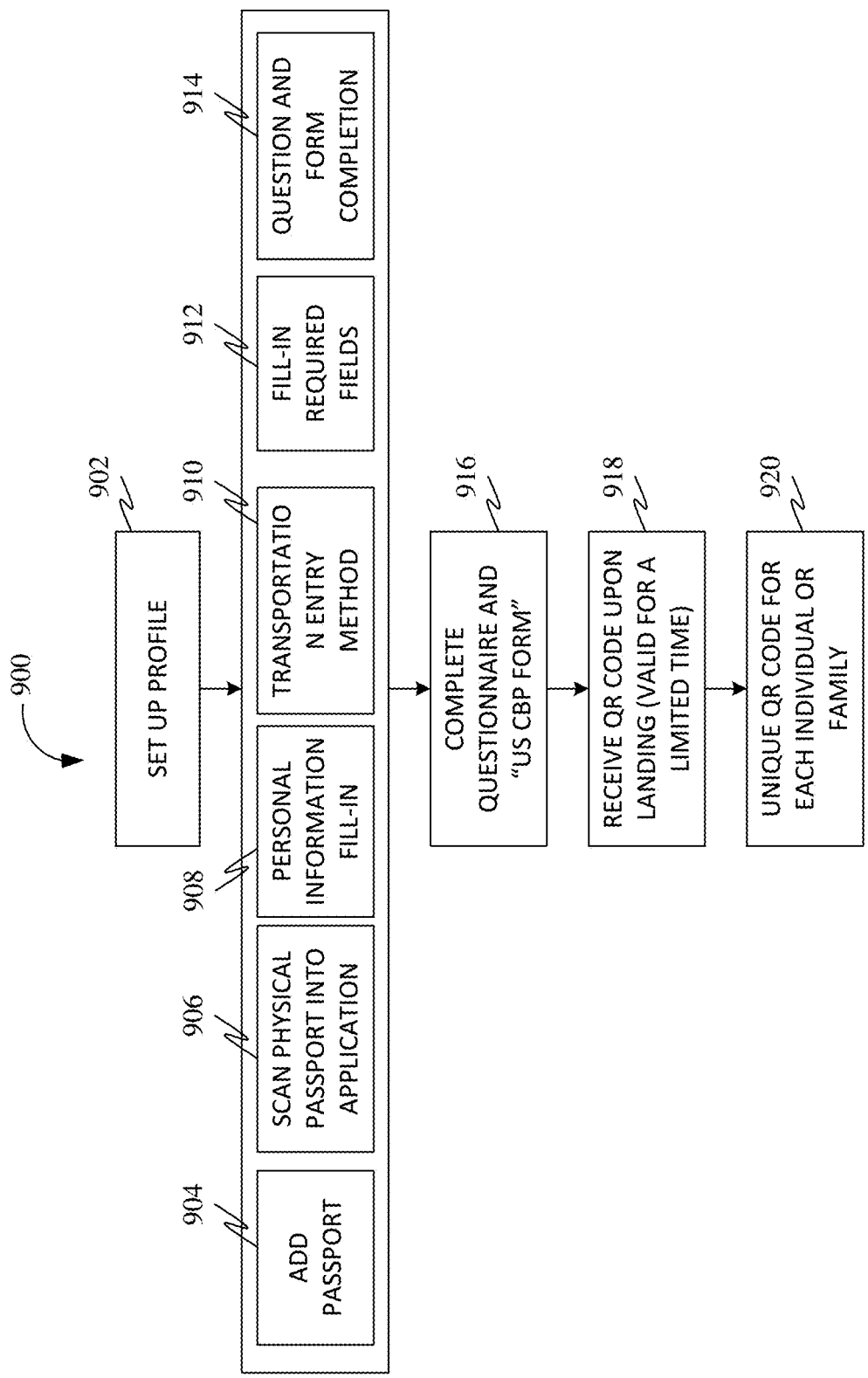
FIG. 9 is a flowchart of a method for obtaining an electronic passport QR code, for facilitating the streamlining of the traveling processes, in accordance with some embodiments.

FIG. 9 is a flowchart of a method 900 for obtaining an electronic passport QR code, for facilitating the streamlining of the traveling processes, in accordance with some embodiments. Accordingly, at 902, the method 900 may include setting up a profile. Further, at 904, the method 900 may include adding a passport. Further, at 906, the method 900 may include scanning a physical passport into an application. Further, at 908, the method 900 may include filling in personal information into the application. Further, at 910, the method 900 may include providing a transportation entry method. Further, at 912, the method 900 may include filling in required fields. Further, at 914, the method 900 may include completing a question and a form. Further, at 916, the method 900 may include completing a questionnaire and "US CBP" form. Further, at 918, the method 900 may include receiving a QR code upon landing. Further, the QR code may be valid for a limited time. Further, at 920, the method 900 may include generating a unique QR code for each individual or a family.

Figure 10:
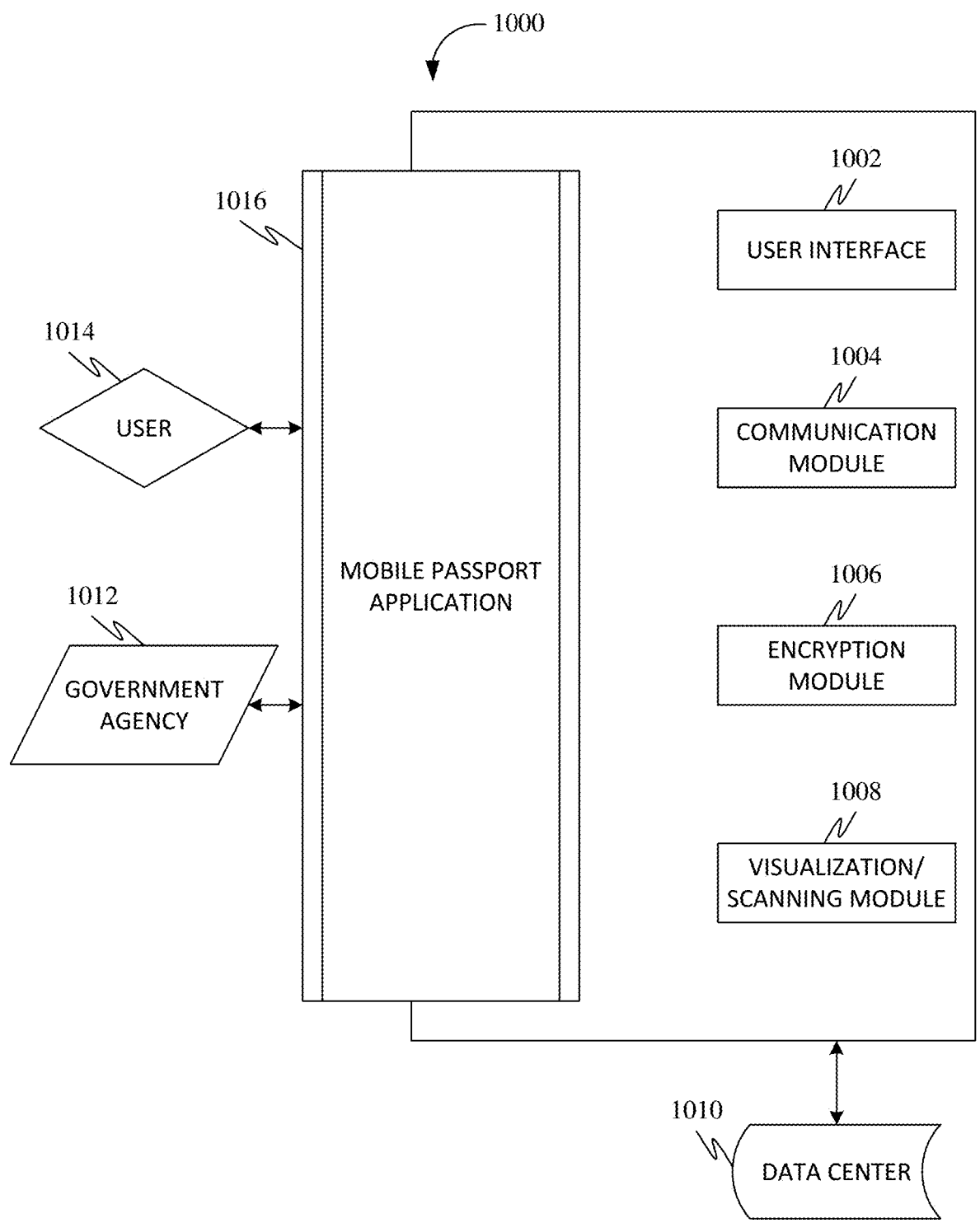
FIG. 10 is a block diagram of a system for facilitating streamlining of traveling processes for traveling, in accordance with some embodiments.

FIG. 10 is a block diagram of a system 1000 for facilitating streamlining of traveling processes for traveling, in accordance with some embodiments. Further, the system 1000 may include a user interface 1002, a communication module 1004, an encryption module 1006, and a visualization/scanning module 1008. Further, the system 100 may be associated with a mobile passport application 1016. Further, a user 1014 interfaces with the system 1000 using the mobile passport application 1016. Further, a government agency 1012 interfaces with the system 1000 using the mobile passport application 1016. Further, a data center 1010 may be communicatively coupled with the system 1000.

Figure 11:
FIG. 11 illustrates a user interface of a mobile passport application with a device for facilitating streamlining of traveling processes for traveling, in accordance with some embodiments.

FIG. 11 illustrates a user interface 1100 of a mobile passport application with a device for facilitating streamlining of traveling processes for traveling, in accordance with some embodiments. Further, the mobile passport application may be iPass. Further, the user interface 1100 may be used for inputting personal information of a user for procuring a new passport.

Figure 12:
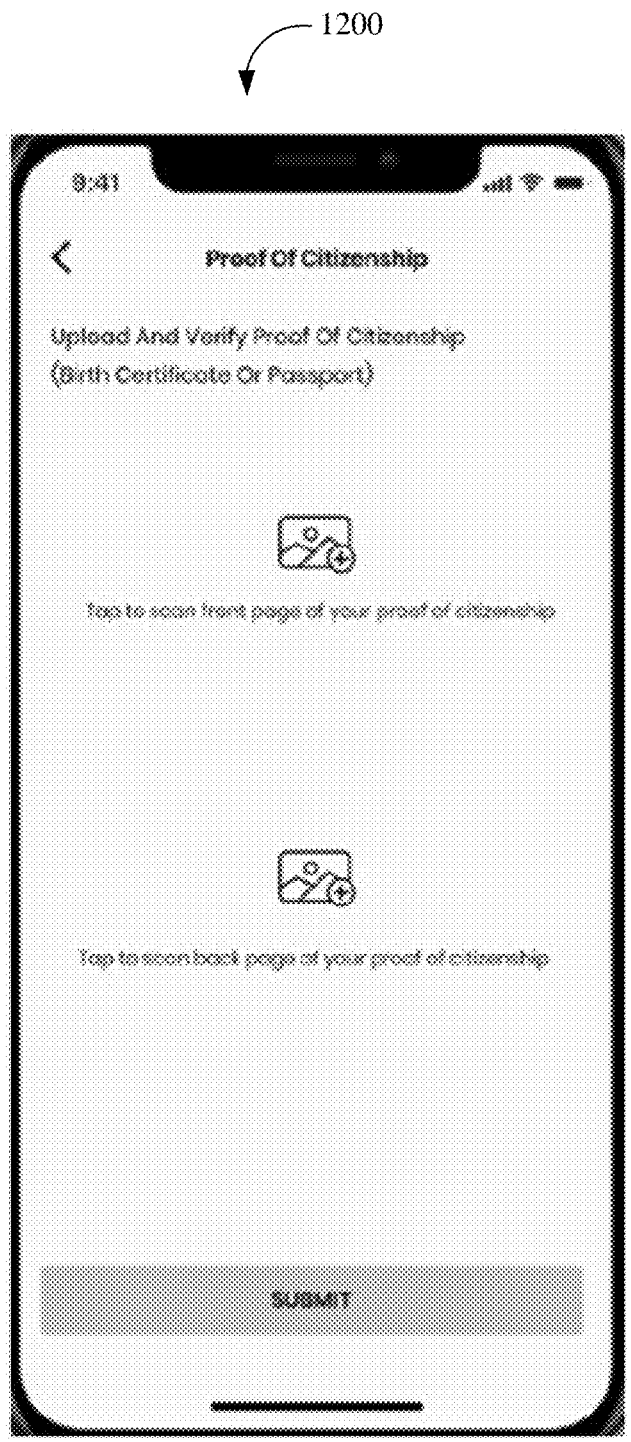
FIG. 12 illustrates a user interface of the mobile passport application with the device for facilitating the streamlining of the traveling processes for the traveling, in accordance with some embodiments.

FIG. 12 illustrates a user interface 1200 of the mobile passport application with the device for facilitating the streamlining of the traveling processes for the traveling, in accordance with some embodiments. Further, the user interface 1200 may be used for uploading and verifying a proof of citizenship of the user.

Figure 13:
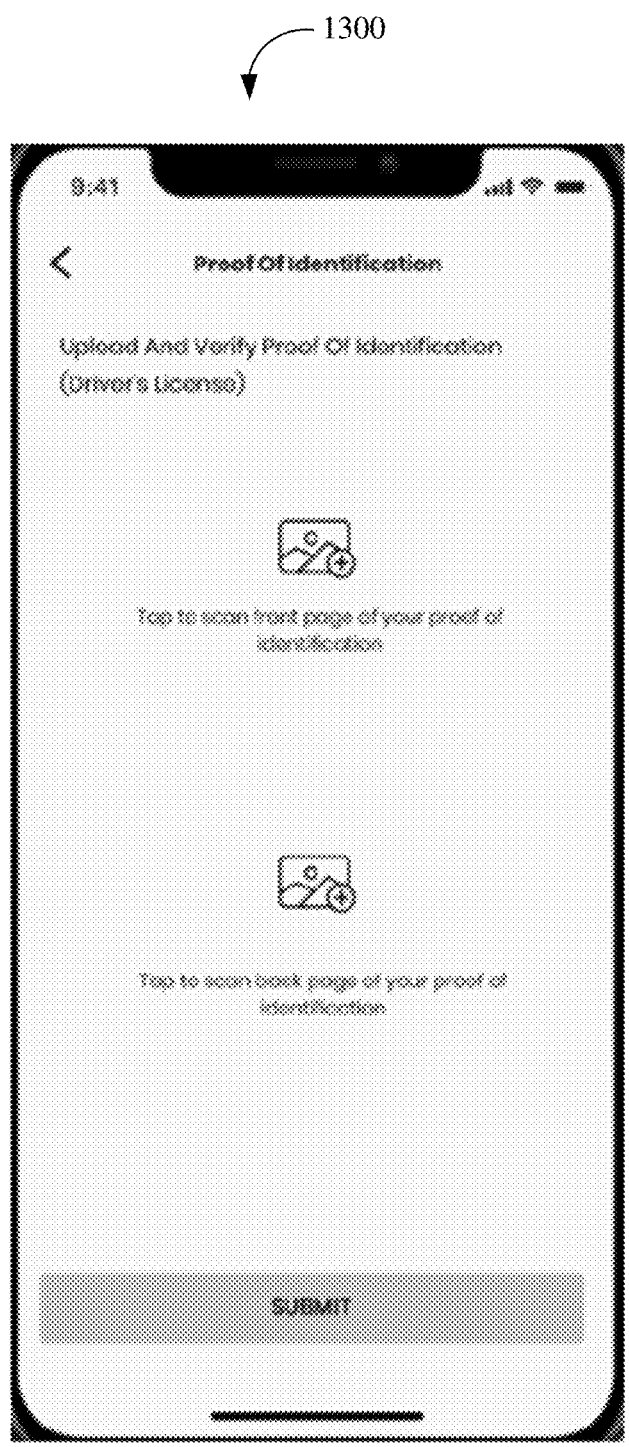
FIG. 13 illustrates a user interface of the mobile passport application with the device for facilitating the streamlining of the traveling processes for the traveling, in accordance with some embodiments.

FIG. 13 illustrates a user interface 1300 of the mobile passport application with the device for facilitating the streamlining of the traveling processes for the traveling, in accordance with some embodiments. Further, the user interface 1300 may be used for uploading and verifying a proof of identification of the user.

Figure 14:
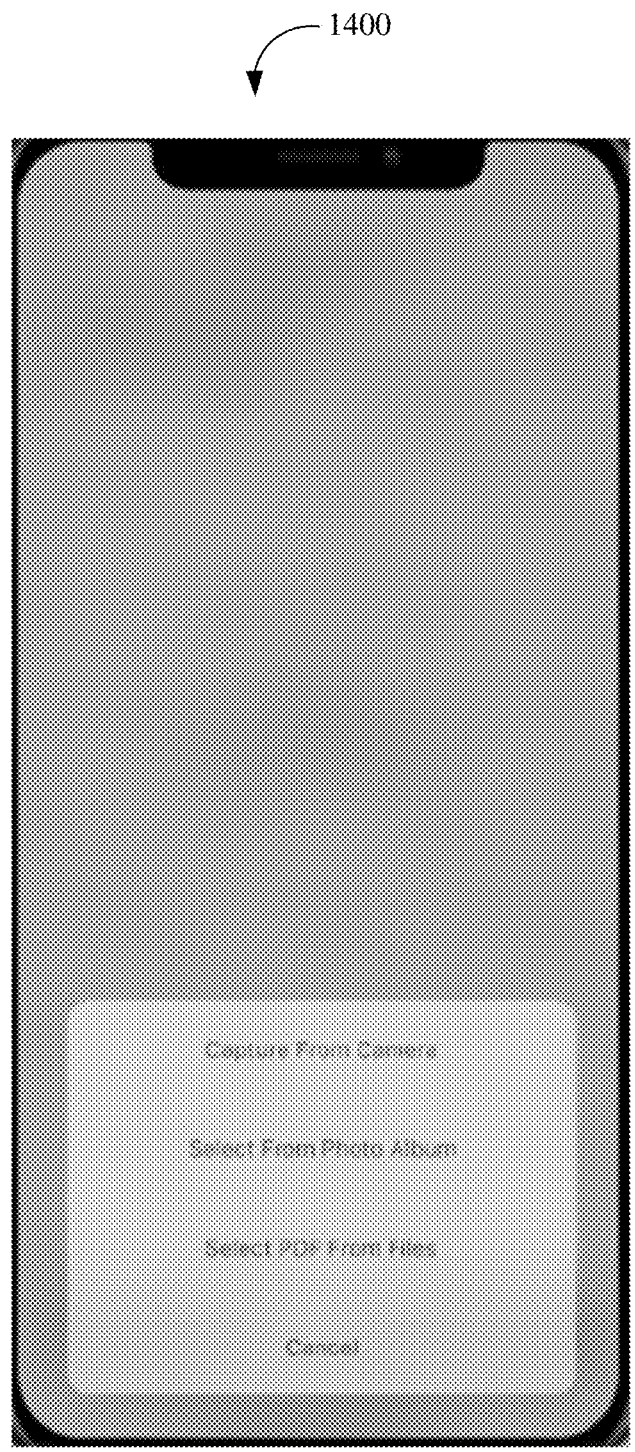
FIG. 14 illustrates a user interface of the mobile passport application with the device for facilitating the streamlining of the traveling processes for the traveling, in accordance with some embodiments.

FIG. 14 illustrates a user interface 1400 of the mobile passport application with the device for facilitating the streamlining of the traveling processes for the traveling, in accordance with some embodiments. Further, the user interface 1400 may be used for uploading a picture of the user.

Figure 15:
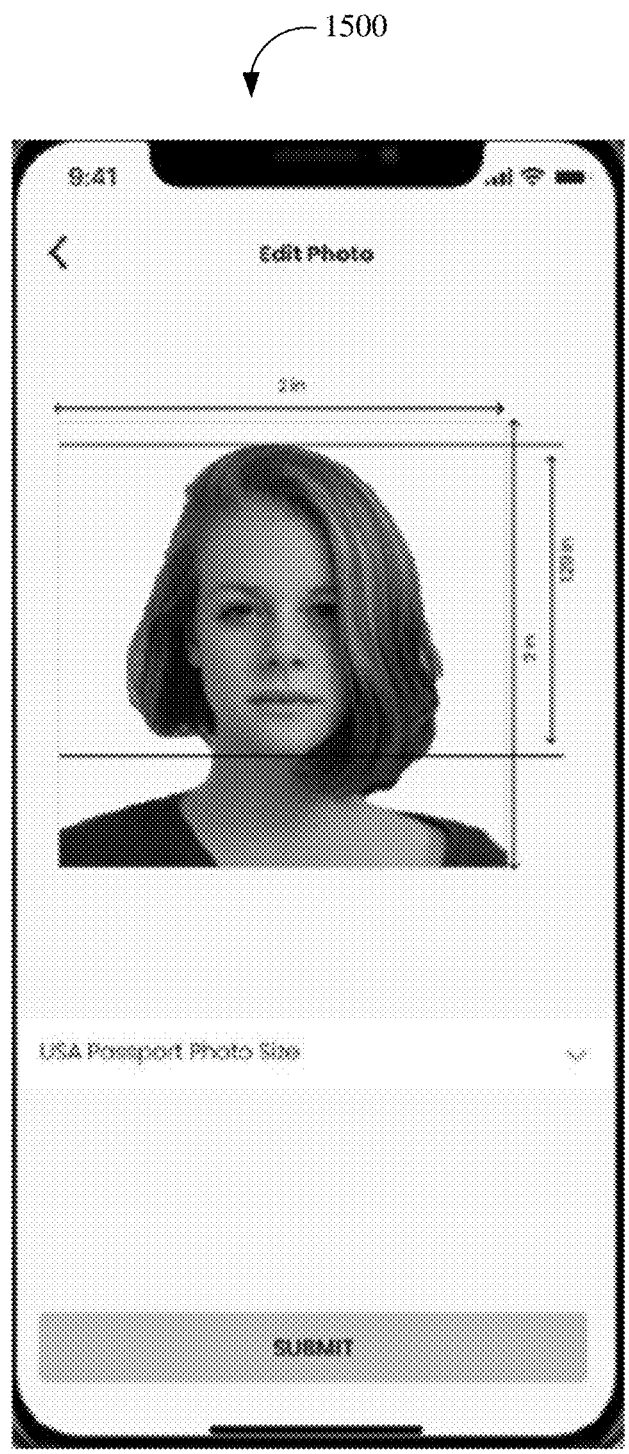
FIG. 15 illustrates a user interface of the mobile passport application with the device for facilitating the streamlining of the traveling processes for the traveling, in accordance with some embodiments.

FIG. 15 illustrates a user interface 1500 of the mobile passport application with the device for facilitating the streamlining of the traveling processes for the traveling, in accordance with some embodiments. Further, the user interface 1500 may be used for formatting the picture of the user.

Figure 16:
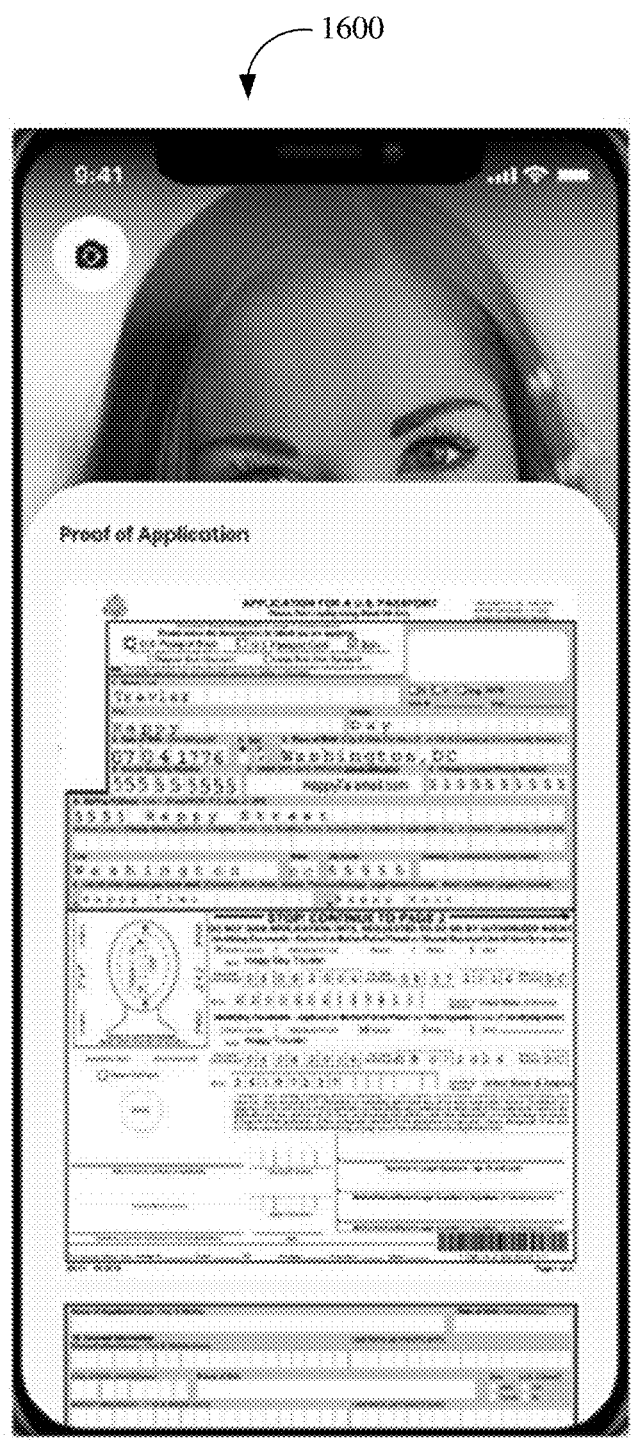
FIG. 16 illustrates a user interface of the mobile passport application with the device for facilitating the streamlining of the traveling processes for the traveling, in accordance with some embodiments.

FIG. 16 illustrates a user interface 1600 of the mobile passport application with the device for facilitating the streamlining of the traveling processes for the traveling, in accordance with some embodiments. Further, the user interface 1600 may be used for verifying a proof of application over a teleconferencing call.

Figure 17:
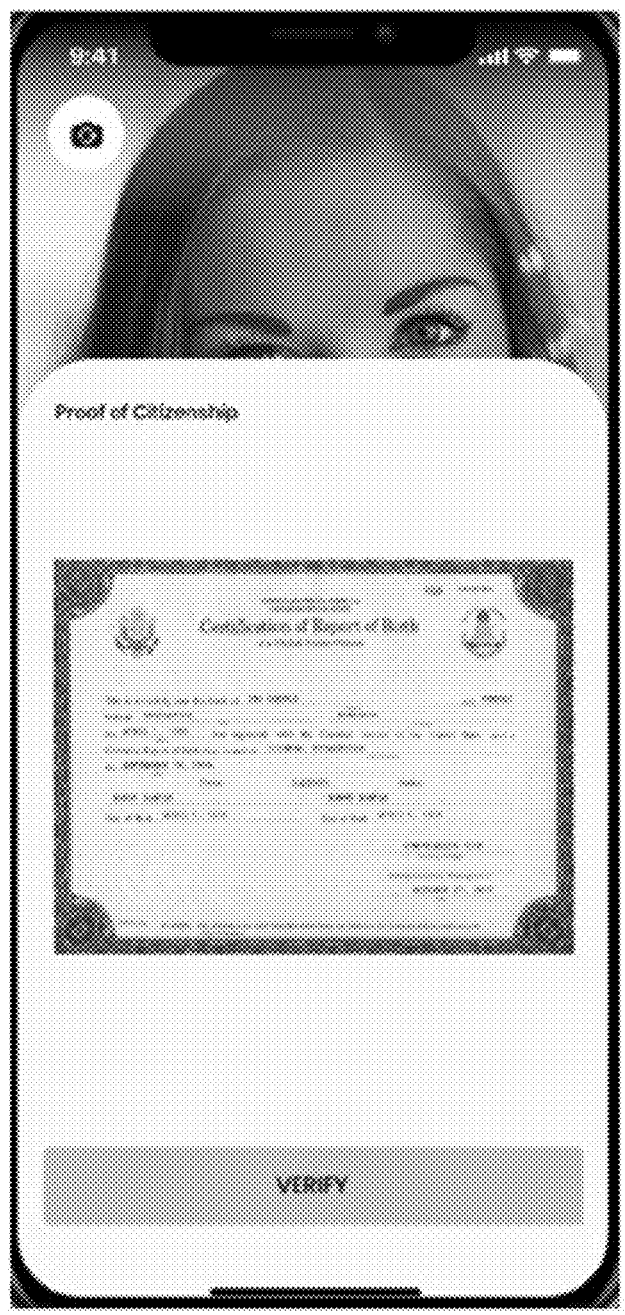
FIG. 17 illustrates a user interface of the mobile passport application with the device for facilitating the streamlining of the traveling processes for the traveling, in accordance with some embodiments.

FIG. 17 illustrates a user interface 1700 of the mobile passport application with the device for facilitating the streamlining of the traveling processes for the traveling, in accordance with some embodiments. Further, the user interface 1700 may be used for verifying a proof of citizenship over the teleconferencing call.

Figure 18:
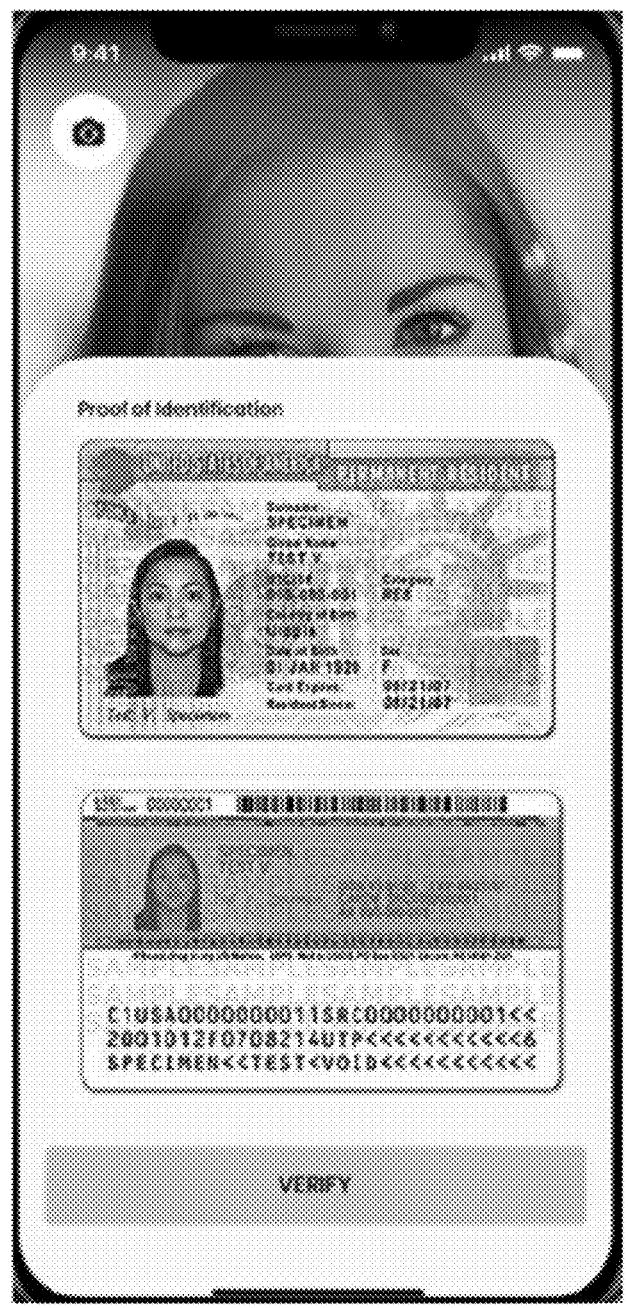
FIG. 18 illustrates a user interface of the mobile passport application with the device for facilitating the streamlining of the traveling processes for the traveling, in accordance with some embodiments.

FIG. 18 illustrates a user interface 1800 of the mobile passport application with the device for facilitating the streamlining of the traveling processes for the traveling, in accordance with some embodiments. Further, the user interface 1800 may be used for verifying a proof of identification over the teleconferencing call.

Figure 19:
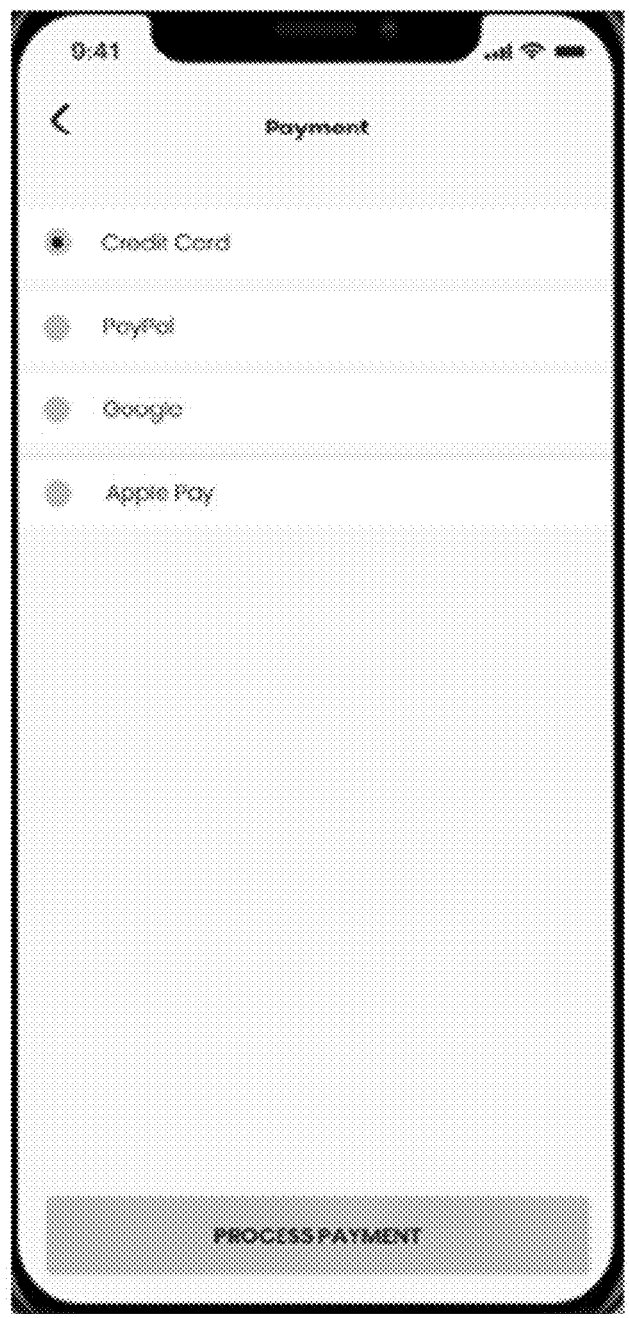
FIG. 19 illustrates a user interface of the mobile passport application with the device for facilitating the streamlining of the traveling processes for the traveling, in accordance with some embodiments.

FIG. 19 illustrates a user interface 1900 of the mobile passport application with the device for facilitating the streamlining of the traveling processes for the traveling, in accordance with some embodiments. Further, the user interface 1900 may be used for providing a plurality of payment options for paying for passport application processes.

Figure 20:
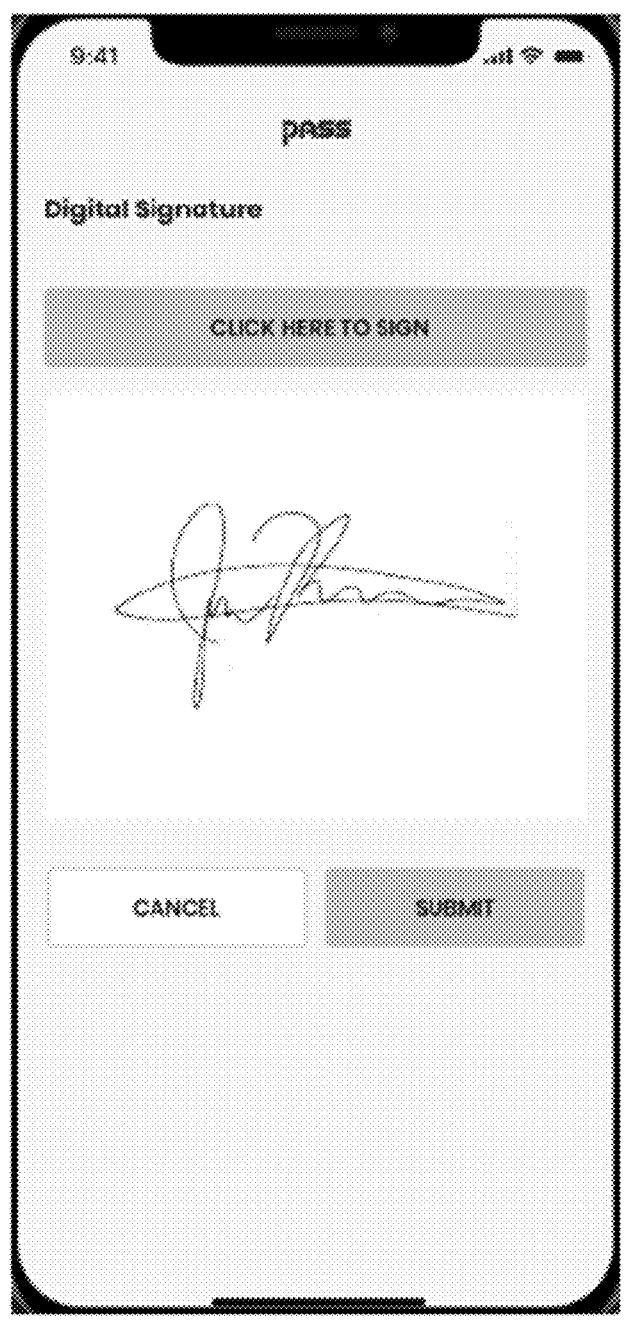
FIG. 20 illustrates a user interface of the mobile passport application with the device for facilitating the streamlining of the traveling processes for the traveling, in accordance with some embodiments.

FIG. 20 illustrates a user interface 2000 of the mobile passport application with the device for facilitating the streamlining of the traveling processes for the traveling, in accordance with some embodiments. Further, the user interface 2000 may be used for allowing e-signing by the user.

Figure 21:
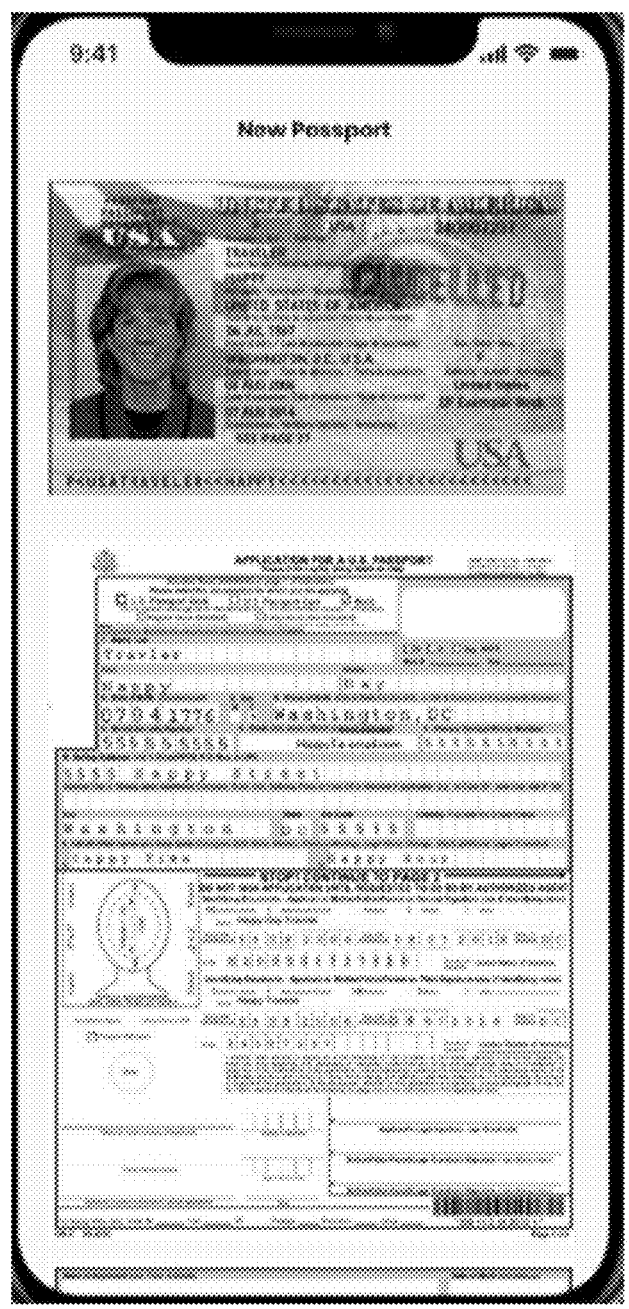
FIG. 21 illustrates a user interface of the mobile passport application with the device for facilitating the streamlining of the traveling processes for the traveling, in accordance with some embodiments.

FIG. 21 illustrates a user interface 2100 of the mobile passport application with the device for facilitating the streamlining of the traveling processes for the traveling, in accordance with some embodiments. Further, the user interface 2100 may be used to provide the new passport to the user.

Figure 22:
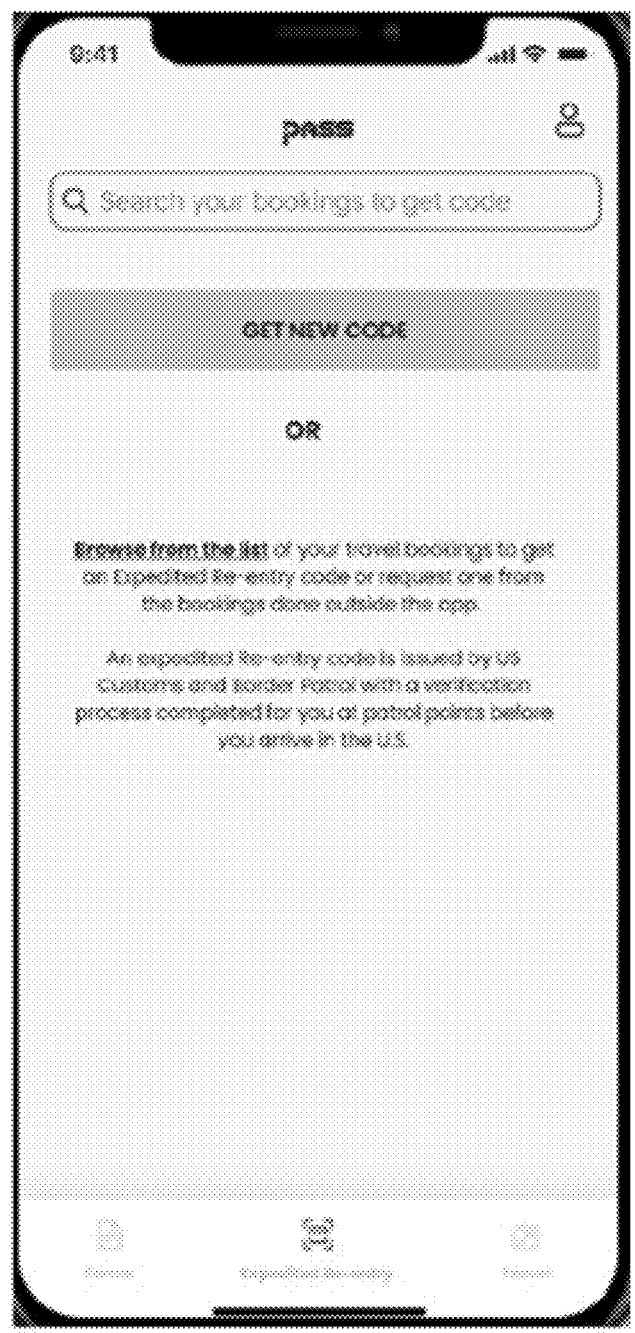
FIG. 22 illustrates a user interface of the mobile passport application with the device for facilitating the streamlining of the traveling processes for the traveling, in accordance with some embodiments.

FIG. 22 illustrates a user interface 2200 of the mobile passport application with the device for facilitating the streamlining of the traveling processes for the traveling, in accordance with some embodiments. Further, the user interface 2200 may be used for providing a new code for expediting a re-entry of the user.

Figure 23:
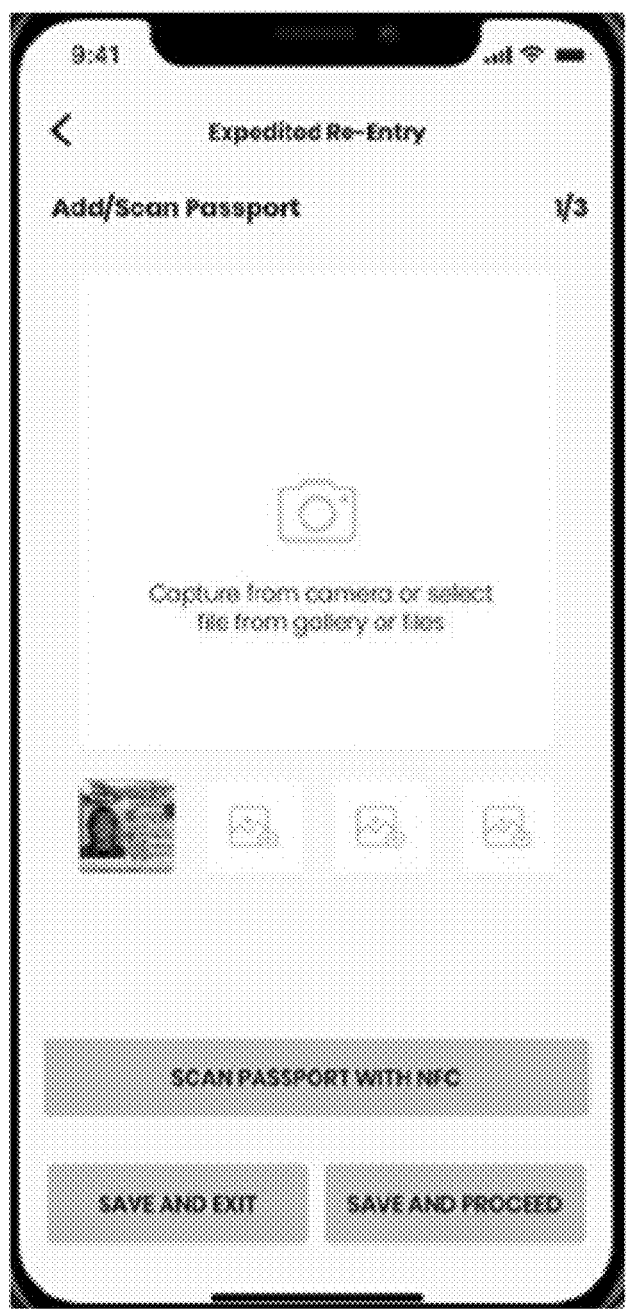
FIG. 23 illustrates a user interface of the mobile passport application with the device for facilitating the streamlining of the traveling processes for the traveling, in accordance with some embodiments.

FIG. 23 illustrates a user interface 2300 of the mobile passport application with the device for facilitating the streamlining of the traveling processes for the traveling, in accordance with some embodiments. Further, the user interface 2300 may be used for adding/scanning a passport of the user for expediting the re-entry.

Figure 24:
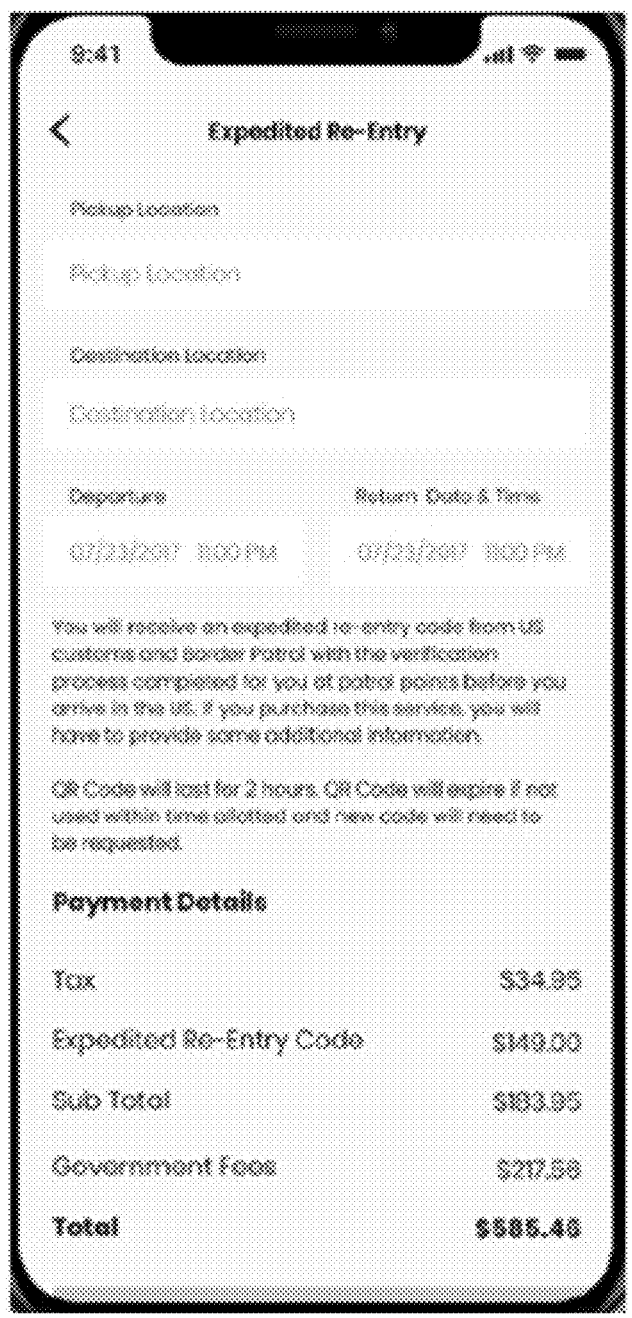
FIG. 24 illustrates a user interface of the mobile passport application with the device for facilitating the streamlining of the traveling processes for the traveling, in accordance with some embodiments.

FIG. 24 illustrates a user interface 2400 of the mobile passport application with the device for facilitating the streamlining of the traveling processes for the traveling, in accordance with some embodiments. Further, the user interface 2400 may be used for providing payment details of payments required from the user for expediting the re-entry.

Figure 25:
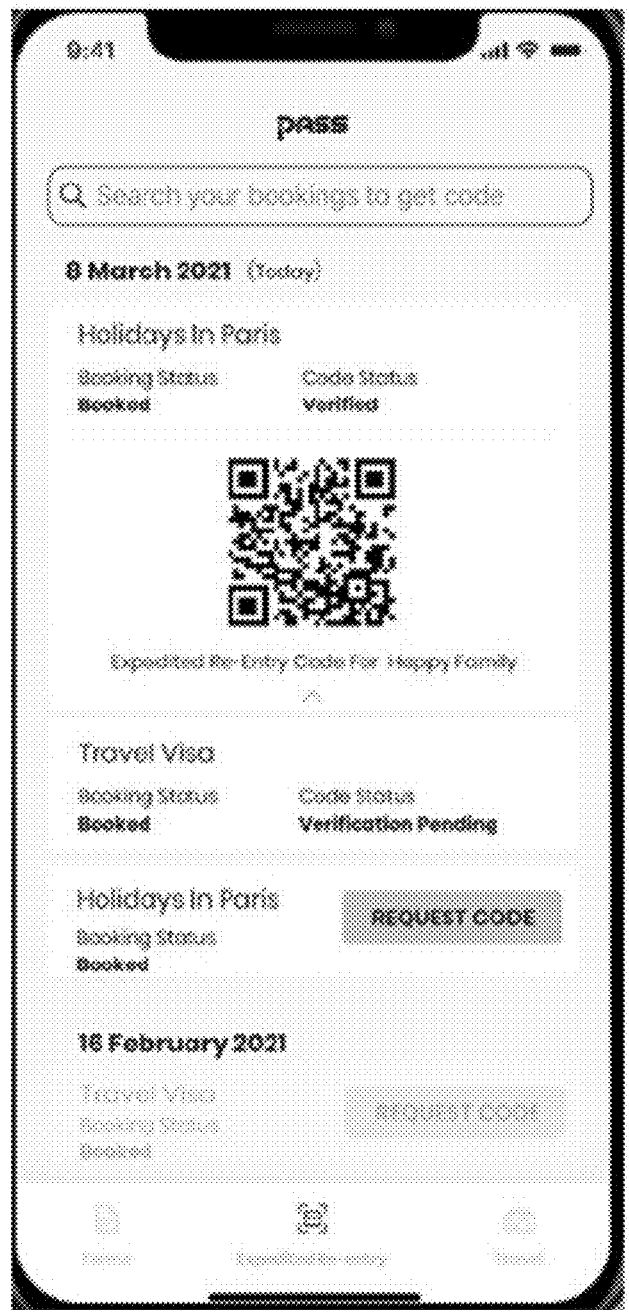
FIG. 25 illustrates a user interface of the mobile passport application with the device for facilitating the streamlining of the traveling processes for the traveling, in accordance with some embodiments.

FIG. 25 illustrates a user interface 2500 of the mobile passport application with the device for facilitating the streamlining of the traveling processes for the traveling, in accordance with some embodiments. Further, the user interface 2500 may be used for providing a re-entry code for expediting the re-entry.

Figure 26:
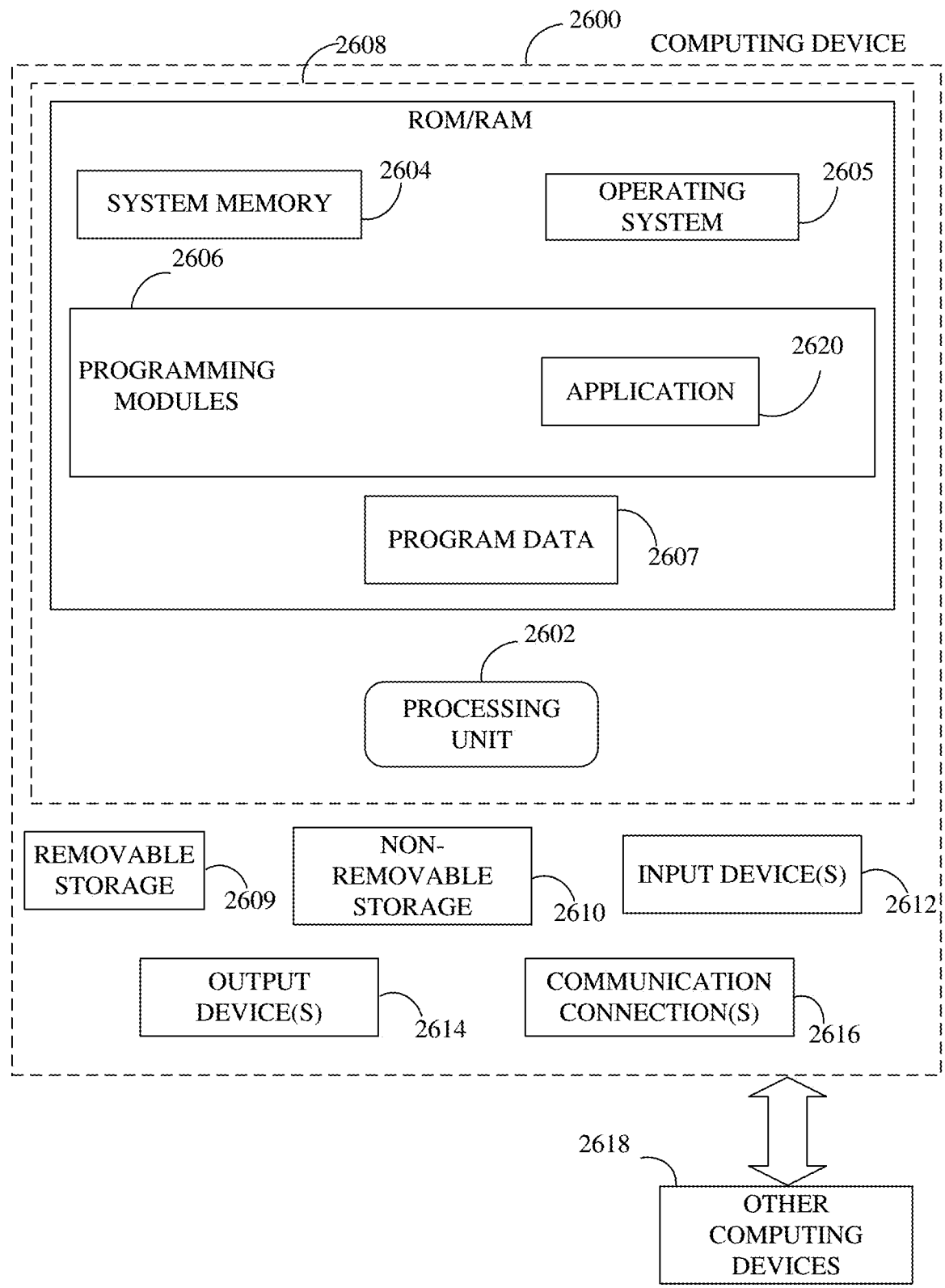
FIG. 26 is a block diagram of a computing device for implementing the methods disclosed herein, in accordance with some embodiments.

With reference to FIG. 26, a system consistent with an embodiment of the disclosure may include a computing device or cloud service, such as computing device 2600. In a basic configuration, computing device 2600 may include at least one processing unit 2602 and a system memory 2604. Depending on the configuration and type of computing device, system memory 2604 may comprise, but is not limited to, volatile (e.g. random-access memory (RAM)), non-volatile (e.g. read-only memory (ROM)), flash memory, or any combination. System memory 2604 may include operating system 2605, one or more programming modules 2606, and may include a program data 2607. Operating system 2605, for example, may be suitable for controlling computing device 2600's operation. In one embodiment, programming modules 2606 may include image-processing module, machine learning module, etc. Furthermore, embodiments of the disclosure may be practiced in conjunction with a graphics library, other operating systems, or any other application program and is not limited to any particular application or system. This basic configuration is illustrated in FIG. 26 by those components within a dashed line 2608.

Computing device 2600 may have additional features or functionality. For example, computing device 2600 may also include additional data storage devices (removable and/or non-removable) such as, for example, magnetic disks, optical disks, or tape. Such additional storage is illustrated in FIG. 26 by a removable storage 2609 and a non-removable storage 2610. Computer storage media may include volatile and non-volatile, removable and non-removable media implemented in any method or technology for storage of information, such as computer-readable instructions, data structures, program modules, or other data. System memory 2604, removable storage 2609, and non-removable storage 2610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 2600. Any such computer storage media may be part of device 2600. Computing device 2600 may also have input device(s) 2612 such as a keyboard, a mouse, a pen, a sound input device, a touch input device, a location sensor, a camera, a biometric sensor, etc. Output device(s) 2614 such as a display, speakers, a printer, etc. may also be included. The aforementioned devices are examples and others may be used.

Computing device 2600 may also contain a communication connection 2616 that may allow device 2600 to communicate with other computing devices 2618, such as over a network in a distributed computing environment, for example, an intranet or the Internet. Communication connection 2616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 2604, including operating system 2605. While executing on processing unit 2602, programming modules 2606 may perform processes including, for example, one or more stages of methods, algorithms, systems, applications, servers, databases as described above. The aforementioned process is an example, and processing unit 2602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 27:
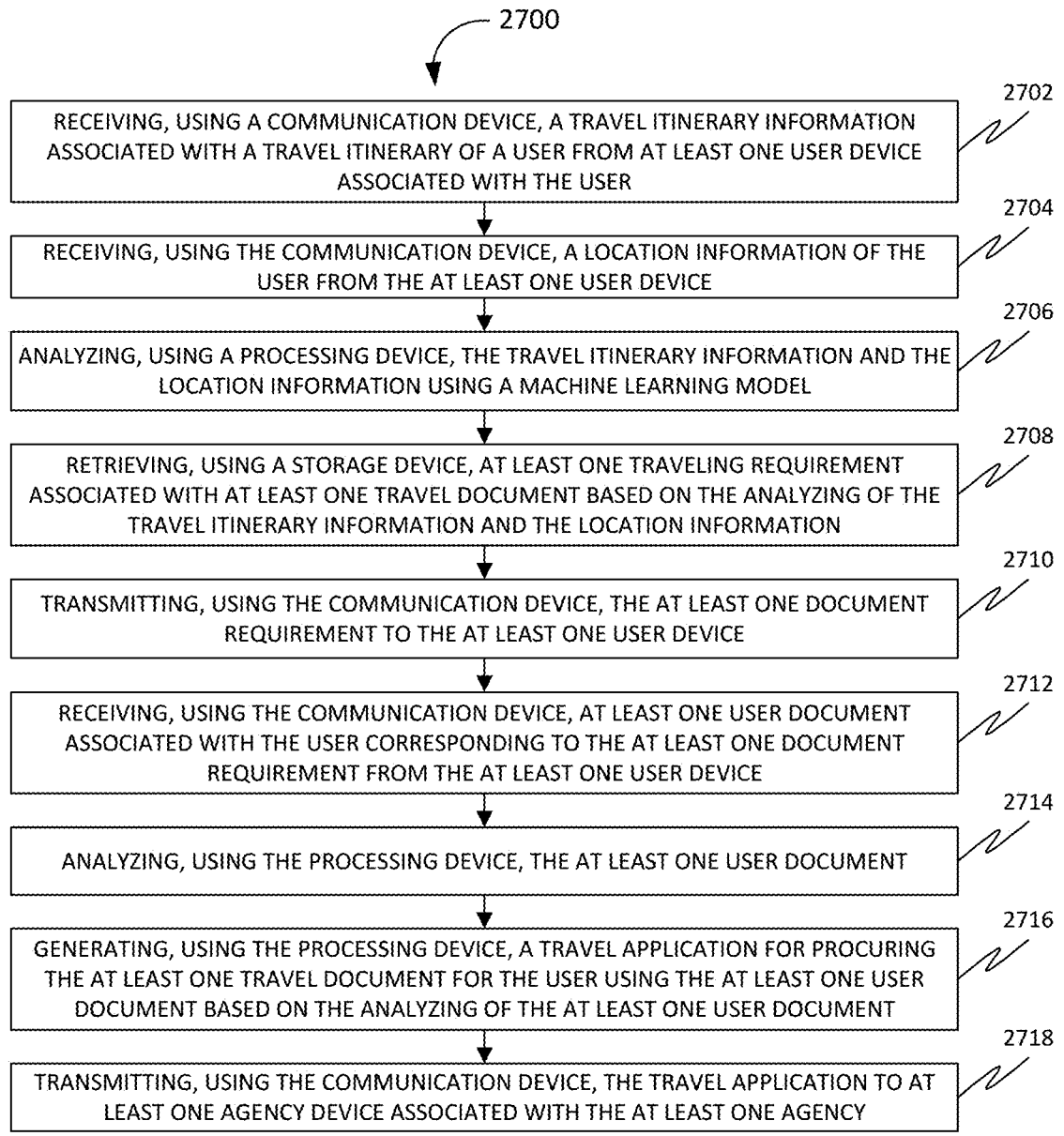
FIG. 27 is a flowchart of a method of facilitating streamlining of traveling processes for traveling, in accordance with some embodiments.

FIG. 27 is a flowchart of a method 2700 of facilitating streamlining of traveling processes for traveling, in accordance with some embodiments. Accordingly, at 2702, the method 2700 may include receiving, using a communication device, a travel itinerary information associated with a travel itinerary of a user from at least one user device (such as at least one user device 3002) associated with the user. Further, the travel itinerary information may include a traveling request and a traveling data. Further, at 2704, the method 2700 may include receiving, using the communication device, a location information of the user from the at least one user device. Further, the at least one user device may include at least one location sensor. Further, the at least one location sensor may be configured for generating the location information of the user based on a location of the user. Further, at 2706, the method 2700 may include analyzing, using a processing device, the travel itinerary information and the location information using a machine learning model. Further, at 2708, the method 2700 may include retrieving, using a storage device, at least one traveling requirement associated with at least one travel document based on the analyzing of the travel itinerary information and the location information. Further, the at least one travel document may include at least one of a VISA and a passport. Further, the passport may include an electronic passport. Further, the traveling requirement may include at least one document requirement associated with the at least one travel document. Further, at 2710, the method 2700 may include transmitting, using the communication device, the at least one document requirement to the at least one user device. Further, at 2712, the method 2700 may include receiving, using the communication device, at least one user document associated with the user corresponding to the at least one document requirement from the at least one user device. Further, at 2714, the method 2700 may include analyzing, using the processing device, the at least one user document. Further, at 2716, the method 2700 may include generating, using the processing device, a travel application for procuring the at least one travel document for the user using the at least one user document based on the analyzing of the at least one user document. Further, at 2718, the method 2700 may include transmitting, using the communication device, the travel application to at least one agency device (such as at least one agency device 3004) associated with the at least one agency. Further, the at least one agency provides the at least one travel document to the user for facilitating the traveling. Further, the at least one travel document may include at least one travel information associated with the at least one travel document.

Further, in some embodiments, the traveling request may include at least one renewal request indicating that the at least one user wants to perform renewal of the at least one travel document. Further, the traveling data may include a renewal traveling data required for the renewal of the at least one travel document. Further, the analyzing of the travel itinerary information and the location information may include analyzing the renewal traveling data and the location information. Further, the at least one document requirement may include a renewal document requirement required for the renewal of the at least one travel document. Further, the at least one user document may include at least one renewal user document corresponding to the renewal document requirement. Further, analyzing of the at least one user document may include analyzing the at least one renewal user document. Further, generating of the travel application may be based on the analyzing of the at least one renewal user document. Further, the travel application may include a renewal application for the renewal of the at least one travel document.

Further, in some embodiments, the analyzing of the at least one user document may include analyzing the at least one user document using at least one second machine learning model. Further, the at least one second machine learning model may be trained for recognizing a marker indicative of at least one of a accurateness and a validity of the at least one user document. Further, the generating of the travel application may be based on the recognizing of the marker.

Further, in some embodiments, the analyzing of the at least one user document may include analyzing the at least one user document using at least one third machine learning model. Further, the at least one third machine learning model may be trained for extracting at least one user information present in the at least one user document. Further, the generating of the travel application may be based on the extracting.

Further, in some embodiments, the analyzing of the at least one user document may include formatting the at least one user document based on at least one document format requirement associated with the at least one agency. Further, the generating of the travel application may be based on the formatting.

Further, in some embodiments, the formatting of the at least one user document may be based on specified outlined rules designed by the at least one agency. Further, the at least one agency may include a regulating authority such as The Department of Homeland Security (DHS)/U. S. Department of State.

Further, in some embodiments, the at least one user device may include at least one capturing device (such as at least one capturing device 3102). Further, the at least one capturing device may be configured for generating the at least one user document based on capturing at least one biometric of the user.

Further, in some embodiments, the at least one user device may include at least one scanning device (such as at least one scanning device 3202). Further, the at least one scanning device may be configured for generating the at least one user document based on scanning at least one physical user document of the user.

Further, in some embodiments, the at least one user device may include at least one input device (such as at least one input device 3302). Further, the at least one input device may be configured for generating the at least one user document based on at least one action performed by the user using the at least one input device.

Figure 28:
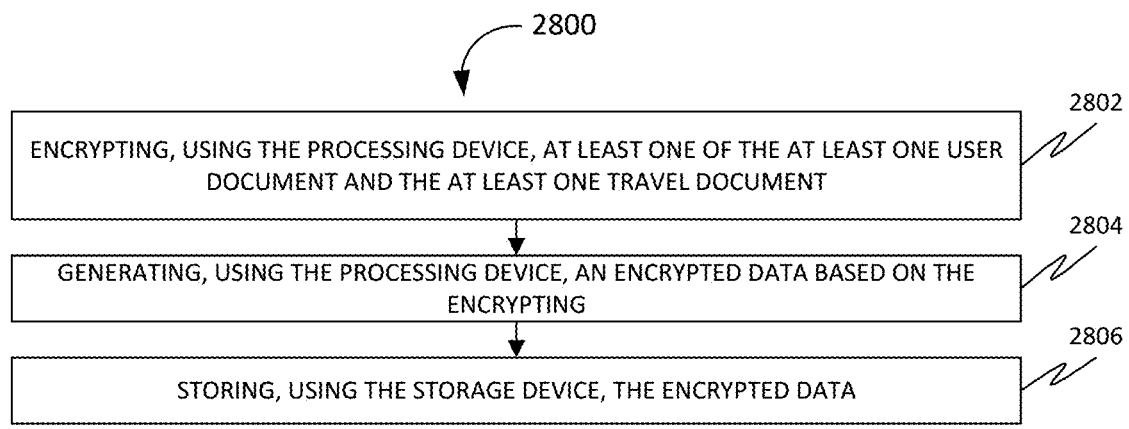
FIG. 28 is a flowchart of a method of facilitating streamlining of traveling processes for traveling, in accordance with some embodiments.

FIG. 28 is a flowchart of a method 2800 of facilitating streamlining of traveling processes for traveling, in accordance with some embodiments. Accordingly, at 2802, the method 2800 may include encrypting, using the processing device, at least one of the at least one user document and the at least one travel document. Further, at 2804, the method 2800 may include generating, using the processing device, an encrypted data based on the encrypting. Further, at 2806, the method 2800 may include storing, using the storage device, the encrypted data. Further, the encrypted data may include at least one encrypted user document and at least one encrypted travel document. Further, the at least one user document may include the at least one encrypted user document. Further, the at least one travel document may include the at least one encrypted travel document. Further, the encrypted data may be secured with passwords with different characters and pin numbers.

Figure 29:
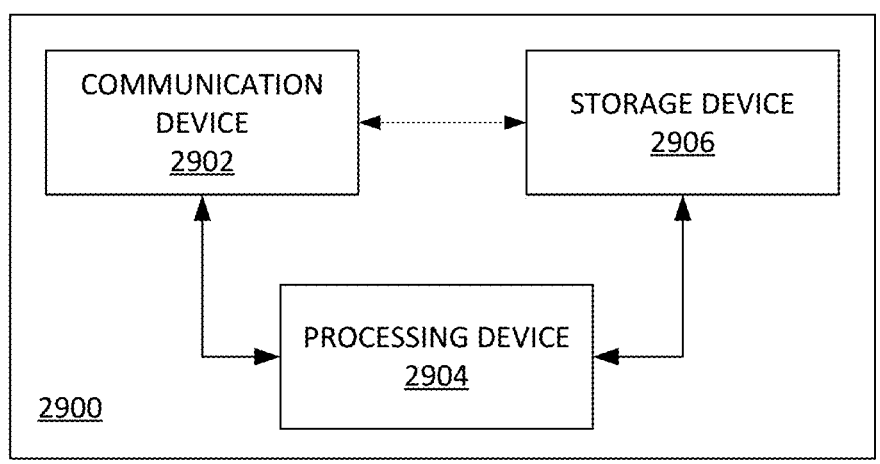
FIG. 29 is a block diagram of a system of facilitating streamlining of traveling processes for traveling, in accordance with some embodiments.
Figure 30:
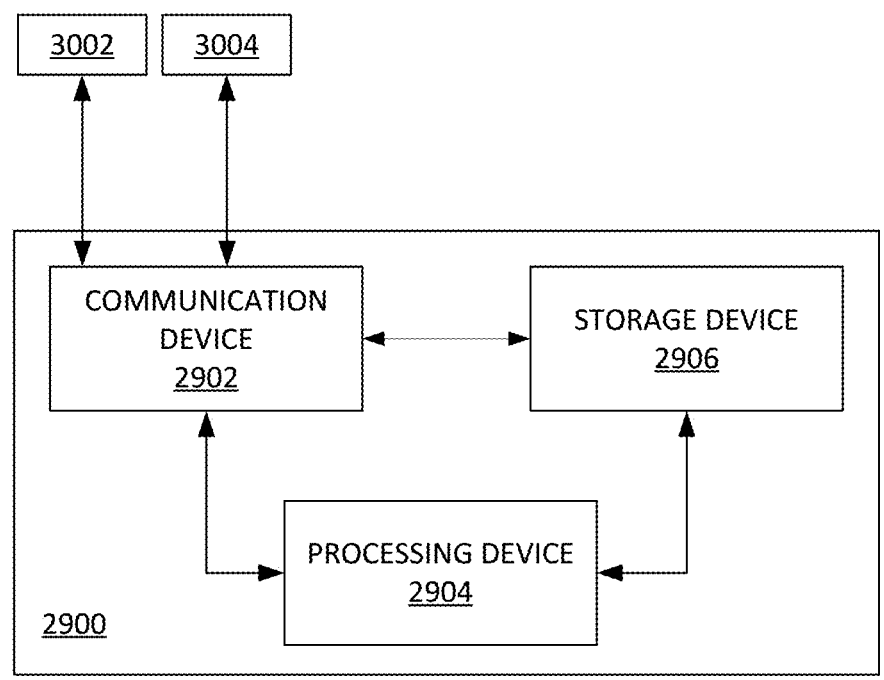
FIG. 30 is a block diagram of the system of facilitating streamlining of traveling processes for traveling, in accordance with some embodiments.

FIG. 29 is a block diagram of a system 2900 of facilitating streamlining of traveling processes for traveling, in accordance with some embodiments. Accordingly, the system 2900 may include a communication device 2902 configured for receiving a travel itinerary information associated with a travel itinerary of a user from at least one user device 3002 (as shown in FIG. 30) associated with the user. Further, the travel itinerary information may include a traveling request and a traveling data. Further, the communication device 2902 may be configured for receiving a location information of the user from the at least one user device 3002. Further, the at least one user device 3002 may include at least one location sensor. Further, the at least one location sensor may be configured for generating the location information of the user based on a location of the user. Further, the communication device 2902 may be configured for transmitting at least one document requirement to the at least one user device 3002. Further, the communication device 2902 may be configured for receiving at least one user document associated with the user corresponding to the at least one document requirement from the at least one user device 3002. Further, the communication device 2902 may be configured for transmitting a travel application to at least one agency device 3004 (as shown in FIG. 30) associated with the at least one agency. Further, the at least one agency provides the at least one travel document to the user for facilitating the traveling. Further, the at least one travel document may include at least one travel information associated with the at least one travel document.

Further, the system 2900 may include a processing device 2904 communicatively coupled with the communication device 2902. Further, the processing device 2904 may be configured for analyzing the travel itinerary information and the location information using a machine learning model. Further, the processing device 2904 may be configured for analyzing the at least one user document. Further, the processing device 2904 may be configured for generating the travel application for procuring the at least one travel document for the user using the at least one user document based on the analyzing of the at least one user document.

Further, the system may include a storage device 2906 communicatively coupled with the communication device 2902. Further, the storage device 2906 may be configured for retrieving the at least one traveling requirement associated with at least one travel document based on the analyzing of the travel itinerary information and the location information. Further, the at least one travel document may include at least one of a VISA and a passport. Further, the traveling requirement may include at least one document requirement associated with the at least one travel document. Further, the passport may include an electronic passport.

Further, in some embodiments, the traveling request may include at least one renewal request indicating that the at least one user wants to perform renewal of the at least one travel document. Further, performing renewal may include renewal of at least one of the visa and the passport. Further, the traveling data may include a renewal traveling data required for the renewal of the at least one travel document. Further, the analyzing of the travel itinerary information and the location information may include analyzing the renewal traveling data and the location information. Further, the at least one document requirement may include renewal document requirement required for the renewal of the at least one travel document. Further, the at least one user document may include at least one renewal user document corresponding to the renewal document requirement. Further, analyzing of the at least one user document may include analyzing the at least one renewal user document. Further, generating of the travel application may be based on the analyzing of the at least one renewal user document. Further, the travel application may include a renewal application for the renewal of the at least one travel document.

Further, in some embodiments, the analyzing of the at least one user document may include analyzing the at least one user document using at least one second machine learning model. Further, the at least one second machine learning model may be trained for recognizing a marker indicative of at least one of a accurateness and a validity of the at least one user document. Further, the generating of the travel application may be based on the recognizing of the marker.

Further, in some embodiments, the analyzing of the at least one user document may include analyzing the at least one user document using at least one third machine learning model. Further, the at least one third machine learning model may be trained for extracting at least one user information present in the at least one user document. Further, the generating of the travel application may be based on the extracting.

Further, in some embodiments, the analyzing of the at least one user document may include formatting the at least one user document based on at least one document format requirement associated with the at least one agency. Further, the generating of the travel application may be based on the formatting.

Further, in some embodiments, the formatting of the at least one user document may be based on specified outlined rules designed by the at least one agency.

Further, in some embodiments, the processing device 2904 may be configured for encrypting at least one of the at least one user document and the at least one travel document. Further, the processing device 2904 may be configured for generating an encrypted data based on the encrypting. Further, the storage device 2906 may be configured for storing the encrypted data. Further, the encrypted data may include at least one encrypted user document and at least one encrypted travel document. Further, the at least one user document may include the at least one encrypted user document. Further, the at least one travel document may include the at least one encrypted travel document.

Figure 31:
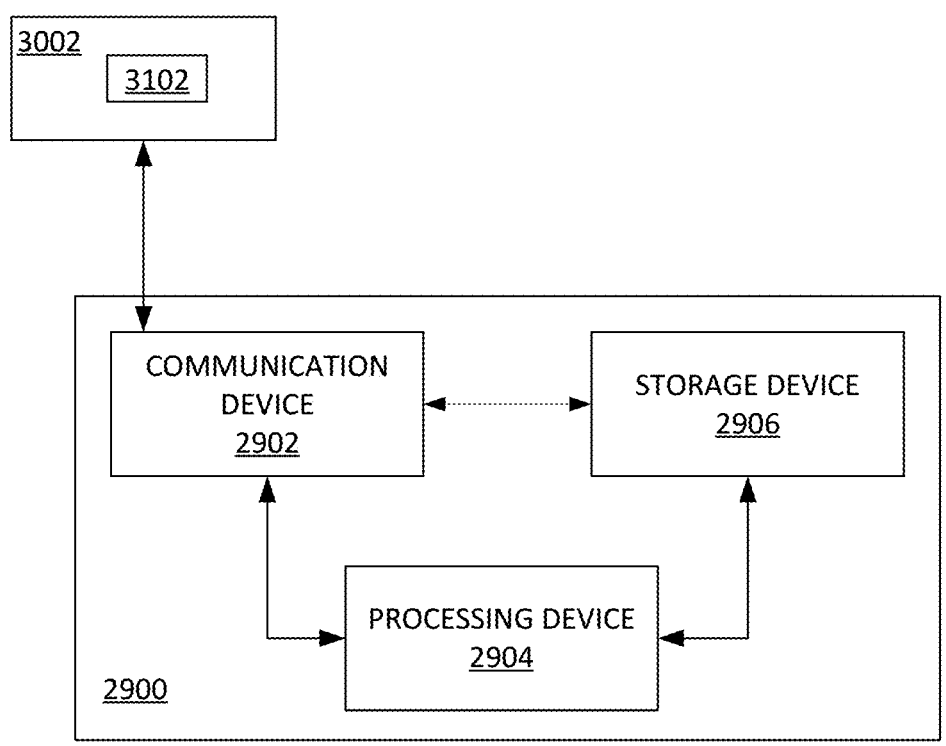
FIG. 31 is a block diagram of the system of facilitating streamlining of traveling processes for traveling, in accordance with some embodiments.

Further, in some embodiments, the at least one user device 3002 may include at least one capturing device 3102 (as shown in FIG. 31). Further, the at least one capturing device 3102 may be configured for generating the at least one user document based on capturing at least one biometric of the user.

Figure 32:
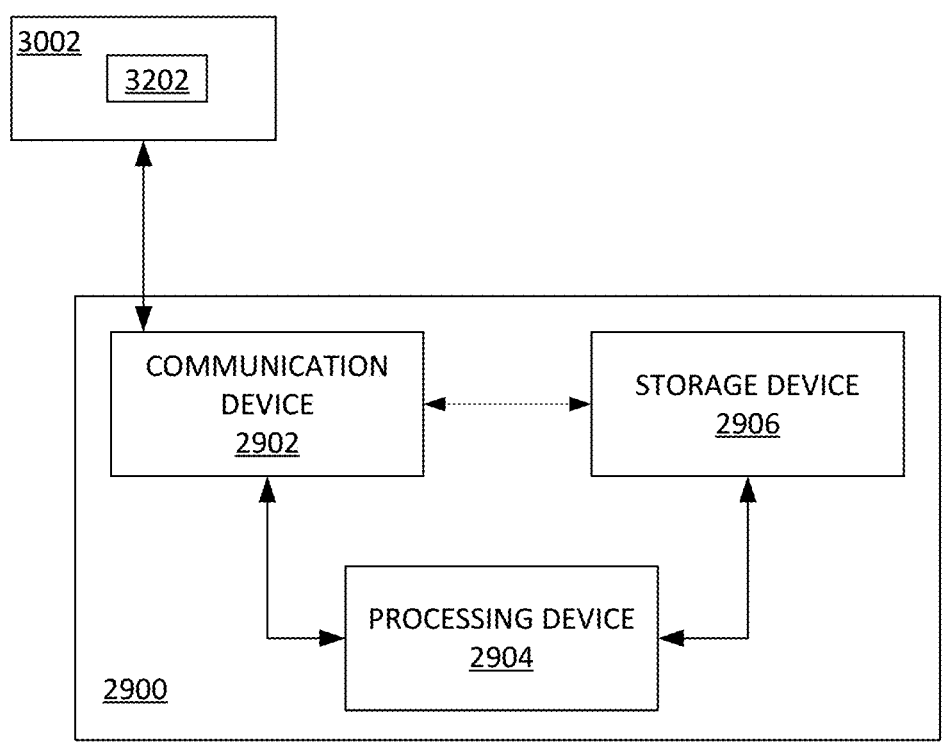
FIG. 32 is a block diagram of the system of facilitating streamlining of traveling processes for traveling, in accordance with some embodiments.

Further, in some embodiments, the at least one user device 3002 may include at least one scanning device 3202 (as shown in FIG. 32). Further, the at least one scanning device 3202 may be configured for generating the at least one user document based on scanning at least one physical user document of the user.

Figure 33:
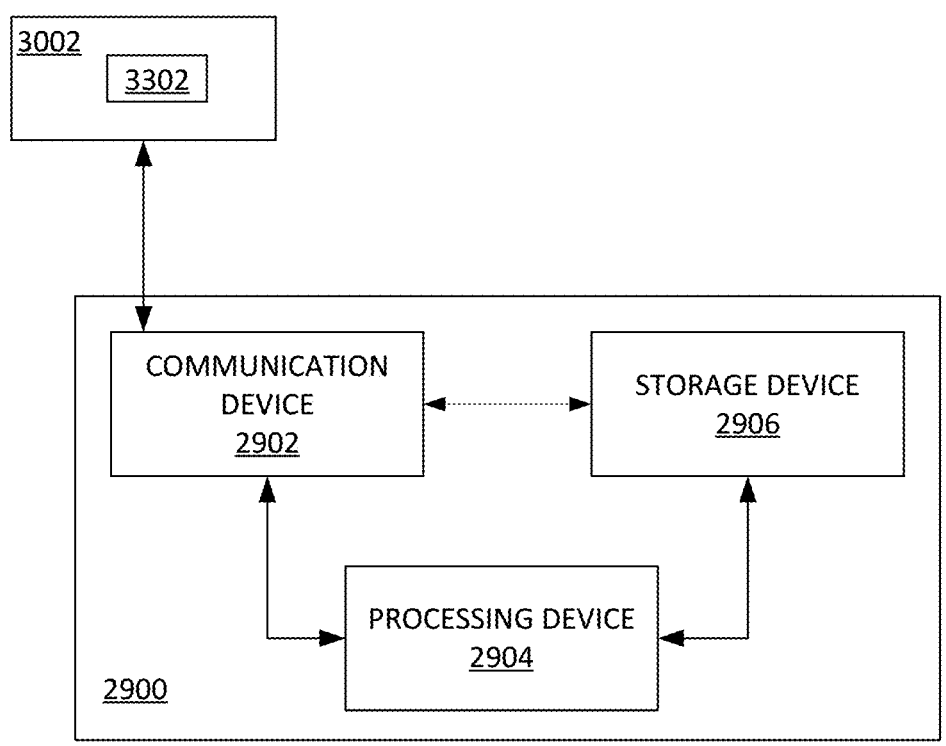
FIG. 33 is a block diagram of the system of facilitating streamlining of traveling processes for traveling, in accordance with some embodiments.

Further, in some embodiments, the at least one user device 3002 may include at least one input device 3302 (as shown in FIG. 33). Further, the at least one input device 3302 may be configured for generating the at least one user document based on at least one action performed by the user using the at least one input device.

FIG. 30 is a block diagram of the system 2900 of facilitating streamlining of traveling processes for traveling, in accordance with some embodiments.

FIG. 31 is a block diagram of the system 2900 of facilitating streamlining of traveling processes for traveling, in accordance with some embodiments.

FIG. 32 is a block diagram of the system 2900 of facilitating streamlining of traveling processes for traveling, in accordance with some embodiments.

FIG. 33 is a block diagram of the system 2900 of facilitating streamlining of traveling processes for traveling, in accordance with some embodiments.

Although the present disclosure has been explained in relation to its preferred embodiment, it is to be understood that many other possible modifications and variations can be made without departing from the spirit and scope of the disclosure.

What is claimed is:

1. A method of facilitating streamlining of traveling processes for traveling, the method comprising:
 receiving, using a communication device, a travel itinerary information associated with a travel itinerary of a user from at least one user device associated with the user, wherein the travel itinerary information comprises a traveling request and a traveling data;
 receiving, using the communication device, a location information of the user from the at least one user device, wherein the at least one user device comprises at least one location sensor, wherein the at least one location sensor is configured for generating the location information of the user based on a location of the user;

analyzing, using a processing device, the travel itinerary information and the location information using a machine learning model;

retrieving, using a storage device, at least one traveling requirement associated with at least one travel document based on the analyzing of the travel itinerary information and the location information, wherein the at least one travel document comprises at least one of a VISA and a passport, wherein the traveling requirement comprises at least one document requirement associated with the at least one travel document;

transmitting, using the communication device, the at least one document requirement to the at least one user device;

receiving, using the communication device, at least one user document associated with the user corresponding to the at least one document requirement from the at least one user device;

analyzing, using the processing device, the at least one user document;

generating, using the processing device, a travel application for procuring the at least one travel document for the user using the at least one user document based on the analyzing of the at least one user document; and transmitting, using the communication device, the travel application to at least one agency device associated with the at least one agency, wherein the at least one agency provides the at least one travel document to the user for facilitating the traveling, wherein the at least one travel document comprises at least one travel information associated with the at least one travel document.

2. The method of claim 1, wherein the traveling request comprises at least one renewal request indicating that the at least one user wants to perform renewal of the at least one travel document, wherein the traveling data comprises a renewal traveling data required for the renewal of the at least one travel document, wherein the analyzing of the travel itinerary information and the location information comprises analyzing the renewal traveling data and the location information, wherein the at least one document requirement comprises renewal document requirement required for the renewal of the at least one travel document, wherein the at least one user document comprises at least one renewal user document corresponding to the renewal document requirement, wherein analyzing of the at least one user document comprises analyzing the at least one renewal user document, wherein generating of the travel application is further based on the analyzing of the at least one renewal user document, wherein the travel application comprises a renewal application for the renewal of the at least one travel document.

3. The method of claim 1, wherein the analyzing of the at least one user document comprises analyzing the at least one user document using at least one second machine learning model, wherein the at least one second machine learning model is trained for recognizing a marker indicative of at least one of a accurateness and a validity of the at least one user document, wherein the generating of the travel application is further based on the recognizing of the marker.

4. The method of claim 1, wherein the analyzing of the at least one user document comprises analyzing the at least one user document using at least one third machine learning model, wherein the at least one third machine learning model is trained for extracting at least one user information present in the at least one user document, wherein the generating of the travel application is further based on the extracting.

5. The method of claim 1, wherein the analyzing of the at least one user document comprises formatting the at least one user document based on at least one document format requirement associated with the at least one agency, wherein the generating of the travel application is further based on the formatting.

6. The method of claim 5, wherein the formatting of the at least one user document is further based on specified outlined rules designed by the at least one agency.

7. The method of claim 1 further comprising:
encrypting, using the processing device, at least one of the at least one user document and the at least one travel document;
generating, using the processing device, an encrypted data based on the encrypting; and
storing, using the storage device, the encrypted data, wherein the encrypted data comprises at least one encrypted user document and at least one encrypted travel document, wherein the at least one user document comprises the at least one encrypted user document, wherein the at least one travel document comprises the at least one encrypted travel document.

8. The method of claim 1, wherein the at least one user device comprises at least one capturing device, wherein the at least one capturing device is configured for generating the at least one user document based on capturing at least one biometric of the user.

9. The method of claim 1, wherein the at least one user device comprises at least one scanning device, wherein the at least one scanning device is configured for generating the at least one user document based on scanning at least one physical user document of the user.

10. The method of claim 1, wherein the at least one user device comprises at least one input device, wherein the at least one input device is configured for generating the at least one user document based on at least one action performed by the user using the at least one input device.

11. A system of facilitating streamlining of traveling processes for traveling, the system comprising:
a communication device configured for:
receiving a travel itinerary information associated with a travel itinerary of a user from at least one user device associated with the user, wherein the travel itinerary information comprises a traveling request and a traveling data;
receiving a location information of the user from the at least one user device, wherein the at least one user device comprises at least one location sensor, wherein the at least one location sensor is configured for generating the location information of the user based on a location of the user;
transmitting at least one document requirement to the at least one user device;
receiving at least one user document associated with the user corresponding to the at least one document requirement from the at least one user device; and
transmitting a travel application to at least one agency device associated with the at least one agency, wherein the at least one agency provides the at least one travel document to the user for facilitating the traveling, wherein the at least one travel document comprises at least one travel information associated with the at least one travel document;
a processing device communicatively coupled with the communication device, wherein the processing device is configured for:

analyzing the travel itinerary information and the location information using a machine learning model;
analyzing the at least one user document; and
generating the travel application for procuring the at least one travel document for the user using the at least one user document based on the analyzing of the at least one user document; and
a storage device communicatively coupled with the communication device, wherein the storage device is configured for retrieving at least one traveling requirement associated with at least one travel document based on the analyzing of the travel itinerary information and the location information, wherein the at least one travel document comprises at least one of a VISA and a passport, wherein the traveling requirement comprises the at least one document requirement associated with the at least one travel document.

12. The system of claim 11, wherein the traveling request comprises at least one renewal request indicating that the at least one user wants to perform renewal of the at least one travel document, wherein the traveling data comprises a renewal traveling data required for the renewal of the at least one travel document, wherein the analyzing of the travel itinerary information and the location information comprises analyzing the renewal traveling data and the location information, wherein the at least one document requirement comprises renewal document requirement required for the renewal of the at least one travel document, wherein the at least one user document comprises at least one renewal user document corresponding to the renewal document requirement, wherein analyzing of the at least one user document comprises analyzing the at least one renewal user document, wherein generating of the travel application is further based on the analyzing of the at least one renewal user document, wherein the travel application comprises a renewal application for the renewal of the at least one travel document.

13. The system of claim 11, wherein the analyzing of the at least one user document comprises analyzing the at least one user document using at least one second machine learning model, wherein the at least one second machine learning model is trained for recognizing a marker indicative of at least one of a accurateness and a validity of the at least one user document, wherein the generating of the travel application is further based on the recognizing of the marker.

14. The system of claim 11, wherein the analyzing of the at least one user document comprises analyzing the at least one user document using at least one third machine learning model, wherein the at least one third machine learning model is trained for extracting at least one user information present in the at least one user document, wherein the generating of the travel application is further based on the extracting.

15. The system of claim 11, wherein the analyzing of the at least one user document comprises formatting the at least one user document based on at least one document format requirement associated with the at least one agency, wherein the generating of the travel application is further based on the formatting.

16. The system of claim 15, wherein the formatting of the at least one user document is further based on specified outlined rules designed by the at least one agency.

17. The system of claim 11, wherein the processing device is further configured for:
encrypting at least one of the at least one user document and the at least one travel document; and
generating an encrypted data based on the encrypting, wherein the storage device is configured for storing the encrypted data, wherein the encrypted data comprises at least one encrypted user document and at least one encrypted travel document, wherein the at least one user document comprises the at least one encrypted user document, wherein the at least one travel document comprises the at least one encrypted travel document.

18. The system of claim 11, wherein the at least one user device comprises at least one capturing device, wherein the at least one capturing device is configured for generating the at least one user document based on capturing at least one biometric of the user.

19. The system of claim 11, wherein the at least one user device comprises at least one scanning device, wherein the at least one scanning device is configured for generating the at least one user document based on scanning at least one physical user document of the user.

20. The system of claim 11, wherein the at least one user device comprises at least one input device, wherein the at least one input device is configured for generating the at least one user document based on at least one action performed by the user using the at least one input device.

* * * * *